(12) United States Patent
Lowenstein

(10) Patent No.: US 6,176,101 B1
(45) Date of Patent: Jan. 23, 2001

(54) FLAT-PLATE ABSORBERS AND EVAPORATORS FOR ABSORPTION COOLERS

(75) Inventor: Andrew I. Lowenstein, Princeton, NJ (US)

(73) Assignee: Gas Research Institute, Chicago, IL (US)

(*) Notice: Under 35 U.S.C. 154(b), the term of this patent shall be extended for 0 days.

(21) Appl. No.: 09/099,595

(22) Filed: Jun. 18, 1998

Related U.S. Application Data

(60) Provisional application No. 60/049,903, filed on Jun. 18, 1997.

(51) Int. Cl.$^7$ ........................................ F25B 15/12
(52) U.S. Cl. ................................. 62/484; 485/476
(58) Field of Search ..................... 62/484, 495, 485, 62/476, 101

(56) References Cited

U.S. PATENT DOCUMENTS

| | | | |
|---|---|---|---|
| 2,210,496 | * 8/1940 | Peltier | ........................ 62/494 |
| 2,617,634 | 11/1952 | Jendrassik . | |

(List continued on next page.)

FOREIGN PATENT DOCUMENTS

| | | | |
|---|---|---|---|
| 364208 | 10/1962 | (CH) . | |
| 261 251 | 3/1988 | (EP) . | |
| 1056314 | 2/1954 | (FR) . | |
| 2 591 504 | 6/1987 | (FR) . | |
| 1575027 | * 6/1990 | (SU) | ..................... 62/494 |

OTHER PUBLICATIONS

Ohuchi, Y.: Development of a Gas–Fired Absorption Heat Pump, *ASHRAE Transactions*, vol. 91, Part 2A, pp. 292–303, Paper No. 2908, 1985.

Biermann, W.: Candidate Chemical Systems for Air Cooled, Solar Powered, Absorption Air Conditioner Design, Part III—Lithium Salts with Anti–Freeze Additives, DOE Contract No. EG–77–C–03–1587 Report, Carrier Corp., Jun. 1978.

Kurosawa, S.: Development of Air–Cooled Small Sized Gas Absorption Chiller–Heater, *IEA Newsletter*, vol. 6, No. 4, pp. 9–11, Dec. 1988.

*Primary Examiner*—William Doerrler
(74) *Attorney, Agent, or Firm*—Pauley Petersen Kinne & Fejer

(57) ABSTRACT

An absorber and evaporator combination for use with an absorption heat pump (including chillers and air conditioners) as well as with other apparatus in which a vapor is absorbed by a liquid absorbent or a liquid or gas is cooled by evaporative cooling is disclosed. The absorber and evaporator are designed as vertical plates that can receive films of either absorbent (on the absorber) or refrigerant (on the evaporator) flowing down them. A liquid refrigerant is distributed across the top edge of each vertical surface of the evaporator. Likewise, for the absorber, a liquid absorbent is distributed across the top edge of each vertical surface. The distributors for the refrigerant and the absorbent are constructed and arranged so that they distribute their respective liquids without creating droplets. In one embodiment, two vertical evaporator surfaces and two vertical absorber surfaces are assembled into one absorber/evaporator panel. The two evaporator surfaces are positioned facing each other but with a small space between them. The two absorber surfaces are similarly positioned facing each other. A single hollow panel is formed by (1) sealing the two opposed evaporator surfaces along their top and bottom edges and along one side edge, (2) sealing the two opposed absorber surfaces along their top and bottom edges and along one side edge, and (3) joining the two absorber surfaces with the two evaporator surfaces along their unsealed side edges in a way that forms a single hollow panel that is enclosed on all sides.

9 Claims, 15 Drawing Sheets

U.S. PATENT DOCUMENTS

| | | | |
|---|---|---|---|
| 3,195,323 | * 7/1965 | Swearingen | 62/494 |
| 4,606,404 | 8/1986 | Le Goff . | |
| 5,174,928 | 12/1992 | Cheng et al. . | |
| 5,282,507 | 2/1994 | Tongu et al. . | |
| 5,542,267 | * 8/1996 | Lee et al. | 62/485 |
| 5,638,900 | 6/1997 | Lowenstein et al. . | |
| 5,660,049 | * 8/1997 | Erickson | 62/107 |
| 5,802,866 | * 9/1998 | Ishiguro | 62/324.2 |
| 5,857,354 | * 1/1999 | Ishiguro | 62/476 |

\* cited by examiner

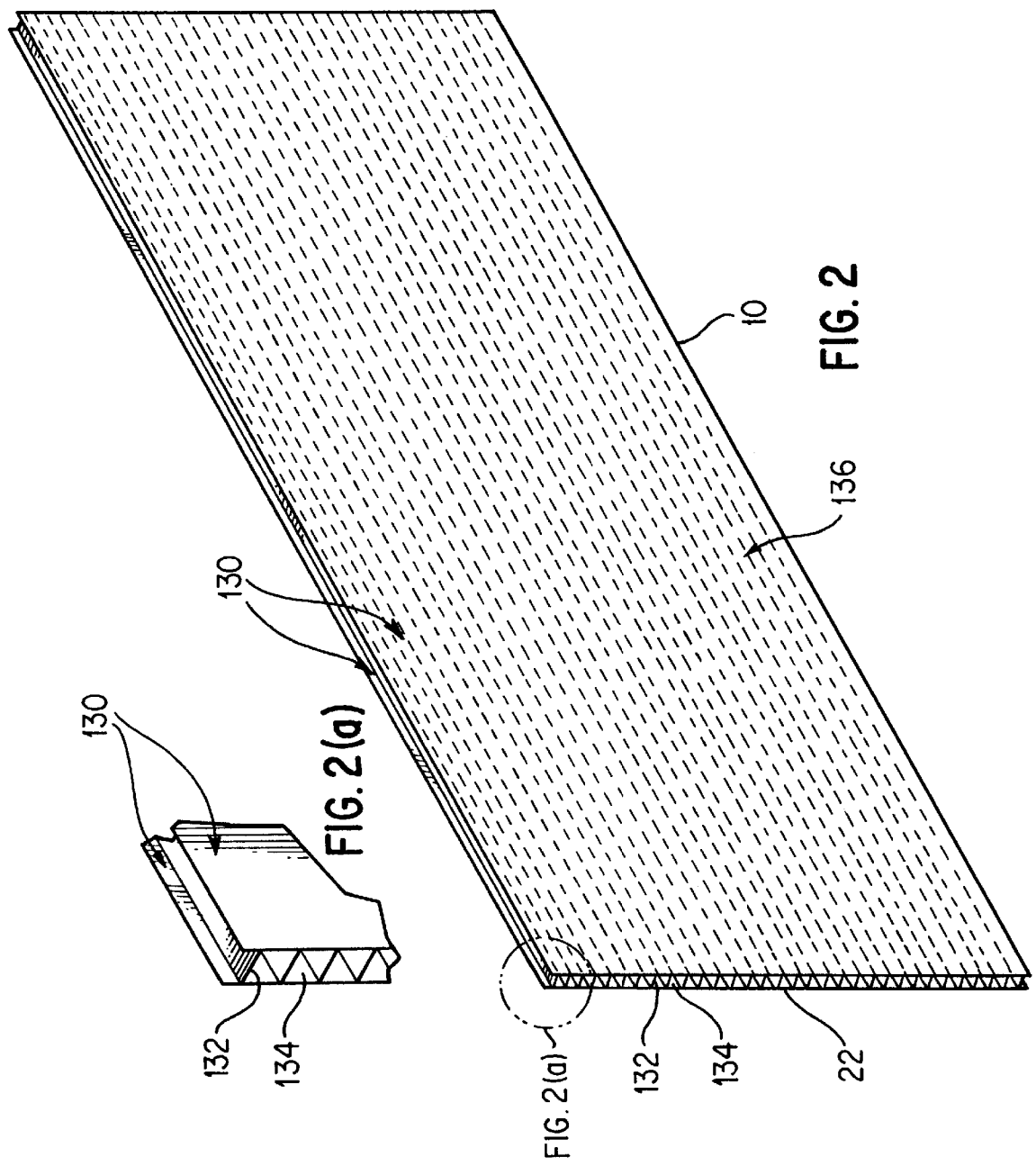

FLAT-PLATE ABSORBERS AND EVAPORATORS FOR ABSORPTION COOLERS

CROSS REFERENCE TO RELATED APPLICATION

This application claims the benefit of U.S. Provisional Application No. 60/049,903, filed Jun. 18, 1997, the disclosure of which earlier application is hereby incorporated by reference herein and made a part hereof, including but not limited to those portions which specifically appear hereinafter.

BACKGROUND OF THE INVENTION

1. Field of Invention

The present invention is generally related to absorber and evaporator heat exchangers in an absorption heat pump. The absorber and evaporator heat exchangers are configured as flat plates that have falling films of either absorbent or refrigerant flowing down their surfaces.

2. Description of the Prior Art

Although electricity is still the primary energy source for our country's air conditioners, chillers and heat pumps, the development of high efficiency absorption systems is leading to a switch from electricity to natural gas in these applications. Since the electric distribution and transmission systems are overburdened in many parts of the country by the summer demand for cooling, and since the natural gas absorption systems use less primary energy in some applications, the switch from electric air conditioners, chillers and heat pumps to systems powered primarily by gas has benefits for the consumer, the utility and the country.

Almost all gas-fired air conditioners, chillers and heat pumps that are now in service are one of two types: engine-driven, vapor-compression systems or absorption systems. Engine-driven vapor-compression systems operate similarly to their electric counterparts with the major difference being that an internal combustion engine, rather than an electric motor, drives the system's compressor.

Absorption systems are fundamentally different than vapor-compression systems. Both systems must raise the pressure of a refrigerant vapor so that it condenses at a temperature that is higher than that of a convenient energy sink (e.g., outdoor air, or water from a cooling tower). However, instead of using a compressor, an absorption system first absorbs the refrigerant vapor into a liquid at low pressure, pumps the liquid up to a high pressure, and then heats the liquid to drive off the refrigerant at the high pressure.

Major obstacles to the wider use of absorption systems are their large size, heavy weight and high cost, which are attributable to the very large heat exchangers that these systems use. It would therefore be a significant advance in the art of absorption systems to reduce the size, weight and cost of absorbers and evaporators—which are the two largest heat exchangers in the absorption system.

Furthermore, absorption systems that use a lithium bromide solution as the absorbent are now practical only in applications where they provide chilled water and reject heat via a cooling tower. This effectively prevents them from being applied in small cooling systems (i.e., cooling capacities under 50 tons), which typically are cooled by outdoor air and deliver cooled air to the building. It would therefore be a significant advance if the absorber of an lithium bromide system was designed so that it could be cooled directly by air and the evaporator was designed so that it could directly cool indoor air.

The most common absorption heat pumps that use solutions of lithium bromide as the absorbent are chillers that reject heat to cooling water (typically water from a cooling tower) and deliver chilled water to the building that is to be cooled. Since chillers are rarely used to cool small buildings, mostly large absorption chillers (cooling capacities of 100 tons or greater) are being manufactured and sold. If a practical absorption heat pump that directly cooled air while rejecting heat to the atmosphere could be developed, lithium-bromide absorption heat pumps could greatly expand their market to include smaller tonnage air conditioners.

An absorption heat pump that directly cools air has been the objective of several R&D efforts. Examples of these are illustrated by Ohuchi, Y., "Development of a Gas-Fired Absorption Heat Pump," pp. 292–303, ASHRAE, Trans., Paper No. 2908, 1983; Biermann, W., "Candidate Chemical Systems for Air Cooled, Solar Powered Absorption Air Conditioner Design, Part III—Lithium salts with Anti-Freeze Additives," DOE Contract No. EG-77-C-03-1587, Carrier Corp., June 1978; and Kurosawa, S., "Development of Air-Cooled Small Sized Gas Absorption Chiller-Heater," IEA Newsletter, Vol.6, No. 4, December 1988.

A problem addressed in the foregoing is the very low heat transfer coefficients on the air-side of the evaporator and absorber, which significantly degrade the system's performance. Up until now, the approach most frequently taken has been to develop new absorption working fluids that have lower equilibrium water vapor pressures, i.e., fluids that can maintain a low evaporator temperature while they themselves operate at a relatively high temperature. These new fluids would permit the absorber to operate at a higher temperature—increasing the driving potential for heat rejection and compensating for the low heat transfer coefficients. Both Biermann (Biermann, W., "Candidate Chemical Systems for Air Cooled, Solar Powered Absorption Air Conditioner Design, Part III—Lithium salts with Anti-Freeze Additives," DOE Contract No. EG-77-C-03-1587, Carrier Corp., June 1978) and Ohuchi (Ohuchi, Y., "Development of a Gas-Fired Absorption Heat Pump," pp. 292–303, ASHRAE Trans., Paper No. 2908, 1983) followed this approach.

Kurosawa (Kurosawa, S., "Development of Air-Cooled Small Sized Gas Absorption Chiller-Heater," IEA Newsletter, Vol.6, No. 4, December 1988) attempted to overcome the performance problems of an air-cooled absorption machine by greatly increasing the surface area of the absorber. This was done by making the absorber from vertical finned tubes that had air flowing over the outside and falling films of lithium bromide solution on the inside. Unfortunately, the Kurosawa design has not produced a manufacturable air-cooled absorption air conditioner.

Thus, a problem associated with common electrically driven air conditioning units is that they consume electricity during summer months of peak demand, and can lead to shortages of electricity and the accompanying brownouts that can occur.

Another problem associated with common electrically driven air conditioning units is that they are extremely expensive to operate, especially in municipalities in which the price of electricity is raised in the summer as a disincentive to air conditioner usage.

More specifically, a problem associated with absorber and evaporator heat exchangers in an absorption heat pump that precede the present invention is that they are prohibitively large for universal application, and hence can only be used in large scale applications.

Yet another problem associated with absorber and evaporator heat exchangers in an absorption heat pump that precede the present invention is that they are extremely heavy, again limiting their applicability in instances other than very large scale applications.

Still a further problem associated with absorber and evaporator heat exchangers in an absorption heat pump that precede the present invention is that they are expensive to build and maintain, which further limits their applicability in instances other than very large scale applications.

For the foregoing reasons, there has been defined a long felt and unsolved need for an absorber and evaporator heat exchangers in an absorption heat pump that is inexpensive to manufacture and can be modified to accommodate a variety of different applications.

SUMMARY OF THE INVENTION

The present invention is directed to absorbers and evaporators of absorption heat pumps (including chillers and air conditioners) that comprise one or more vertically oriented surfaces.

For the evaporator, a liquid refrigerant is distributed across the top edge of each vertical surface. The refrigerant is distributed so that approximately uniform films of refrigerant flow down the vertical surfaces of the evaporator. Likewise, for the absorber, a liquid absorbent is distributed across the top edge of each vertical surface. The absorbent is distributed so that approximately uniform films of absorbent flow down the vertical surfaces of the absorber.

The distributors for the refrigerant and the absorbent are designed so that they distribute their respective liquids without creating droplets. The surfaces of both the absorber and the evaporator are designed to evenly distribute their respective liquids over their surfaces. This may involve etching or chemically treating the surfaces, roughening or otherwise providing them with a texture, flocking them with a wettable fiber or applying a woven or non-woven wick to them.

In one embodiment of the present invention, two vertical evaporator surfaces and two vertical absorber surfaces are assembled into one absorber/evaporator panel. The evaporator and absorber surfaces are made from thin flat plates. The two evaporator surfaces are positioned facing each other but with a small space between them. The two absorber surfaces are similarly positioned facing each other. A single hollow panel is formed by (1) sealing the two opposed evaporator surfaces along their top and bottom edges and along one side edge, (2) sealing the two opposed absorber surfaces along their top and bottom edges and along one side edge, and (3) joining the two absorber surfaces with the two evaporator surfaces along their unsealed side edges in a way that forms a single hollow panel that is enclosed on all sides.

When operating as an absorption system, the volume enclosed within the panel is evacuated. A liquid absorbent flows into the panel through a tube that penetrates one of the panel walls, and the liquid absorbent is evenly distributed along the top edges of the two opposed absorber surfaces. The absorbent flows down the inner surfaces of the absorber as a thin film. The refrigerant flows into the panel through a second tube that distributes the refrigerant along the top edges of the two opposed evaporator surfaces, and the refrigerant flows down these surfaces as a thin film. As the refrigerant flows down the walls of the evaporator, it evaporates. The vapor that is formed flows from the evaporator side of the hollow panel to the absorber side where it is absorbed into the falling films of absorbent. The refrigerant that flows to the bottom of the evaporator surface is collected and transferred out of the panel through a refrigerant collection tube that penetrates one of the panel walls. Similarly, the absorbent that flows to the bottom of the absorber surface is collected and transferred out of the panel through an absorbent collection tube that penetrates one of the panel walls.

A gas or liquid stream that is to be heated flows in contact with the outer surfaces of the absorber side of the panel; and a gas or liquid stream that is to be cooled flows in contact with the outer surfaces of the evaporator side. As the refrigerant evaporates on the inside of the panel, heat is transferred from the gas or liquid that is flowing on the outside of the evaporator, through the evaporator surfaces and into the refrigerant. As the falling film of absorbent absorbs the refrigerant vapor, heat is released. This heat flows through the absorber surfaces and into the gas or liquid that flows over the outside of the absorber. One or more of the preceding absorber/evaporator panels can be used in an absorption heat pump.

It is therefore an object of the present invention to provide an absorber and evaporator heat exchanger in an absorption heat pump that is not bulky in design.

Another object of the present invention is to provide an absorber and evaporator heat exchanger in an absorption heat pump so that its usage in air conditioning applications will not consume electricity during summer months of peak demand, potentially leading to shortages of electricity and the accompanying brownouts that can occur.

Still another object of the present invention is to provide an absorber and evaporator heat exchanger in an absorption heat pump that is inexpensive to operate, especially as compared to traditional air conditioners which use electricity.

Yet another object of the present invention is to provide an absorber and evaporator heat exchanger in an absorption heat pump that is not prohibitively large for universal application, and hence is more readily adaptable to smaller scale applications.

An even further object of the present invention is to provide an absorber and evaporator heat exchanger in an absorption heat pump that is not extremely heavy, thereby further facilitating its applicability in instances other than very large scale applications.

Another object of the present invention is to provide an absorber and evaporator heat exchanger in an absorption heat pump that is not expensive to build and maintain.

These and other objects, advantages and features of the present invention will be apparent from the detailed description that follows.

DESCRIPTION OF THE DRAWINGS

In the detailed description that follows, reference will be made to the following figures:

FIG. 2 is a perspective view of a portion of another preferred embodiment;

FIG. 2 (*a*) is an exploded view of a portion of FIG. 2;

FIG. 3 (*a*) is an exploded view of a portion of FIG. 3;

FIG. 8 (*a*) is an exploded view of a portion of FIG. 8;

DETAILED DESCRIPTION OF THE PREFERRED EMBODIMENTS

Figure 1:
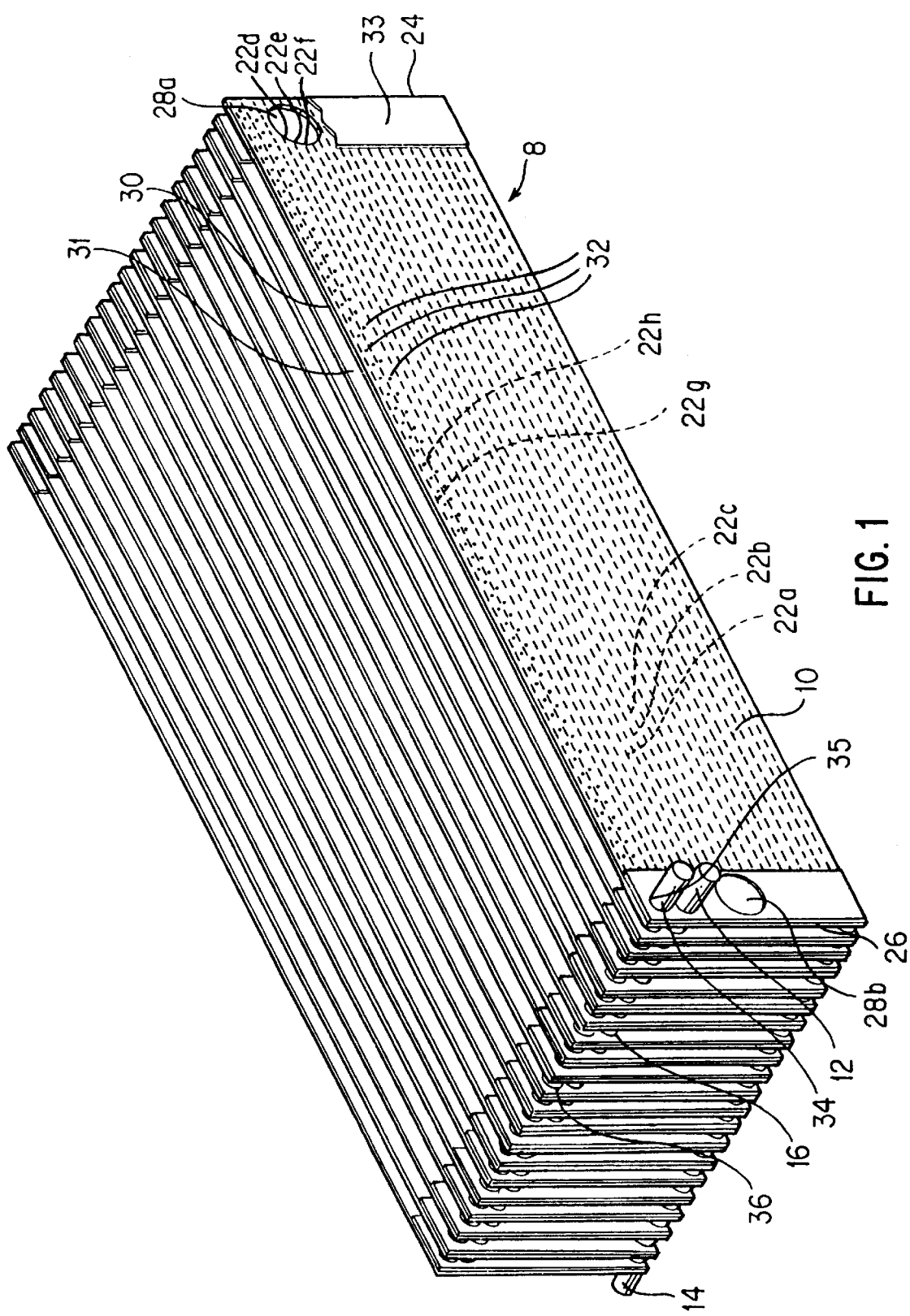
FIG. 1 is a partial perspective view of a portion of a preferred embodiment.

FIG. 1 illustrates a partial perspective view of a flat-plate absorber (or evaporator) 8 made from flat plates 10 having internal passages or channels 22. The plates 10 of the absorber 8 can be made from (1) profile board, if the wall material is plastic or an extrudable metal (e.g., copper, aluminum); (2) corrugated board, if the wall material is a plastic or metal that can be readily joined by welding, brazing, soldering, fusing or gluing; (3) thermoformed sheets, if the wall material is a thermoplastic; (4) stamped or pressure-formed sheets, if the wall material is a metal; or (5) individual tubes that are either joined together along their lengths or spaced apart and joined by webs that attach to the tubes along their lengths.

FIG. 2 illustrates a perspective view of a plate 10 with multiple channels 22 in the form of profile board 18 that can be used to make either a flat-plate absorber or a flat-plate evaporator. As shown, the profile board 18 is constructed as an extrusion, either plastic or metal, and as a double walled sheet 136. The walls 130 are separated by a series of ribs or webs 132, preferably uniformly spaced, which run the full length of the sheet 136. The spacing between the ribs 132 creates the plurality of channels 134 referred to herein. An example of the construction of profile board is disclosed in U.S. Pat. No. 4,898,153, incorporated herein by reference.

In applications where the walls 130 of the absorber plates 10 are not wettable (e.g., the walls are plastic) or the flow rates of absorbent are low, it can be relatively difficult to create a continuous, uniform film of absorbent on the surface of the plates 10. In these applications, the surface of the plate 10 is modified to make it wettable and/or wicked by either (1) chemically etching the surfaces of the plates 10; (2) roughening or otherwise providing the plates 10 with texture; (3) flocking the plates 10 with a wettable fiber; or (4) applying a woven or non-woven wick to the plates 10.

Figure 3A:
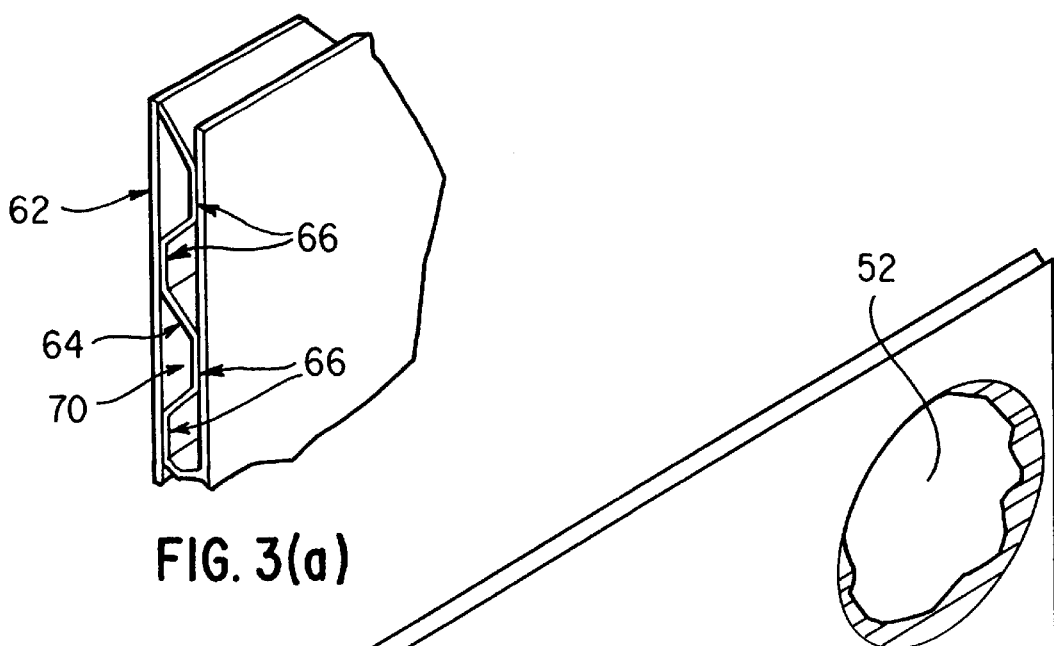
FIG. 3 is a partial perspective side view of a portion of yet another preferred embodiment.
Figure 3:
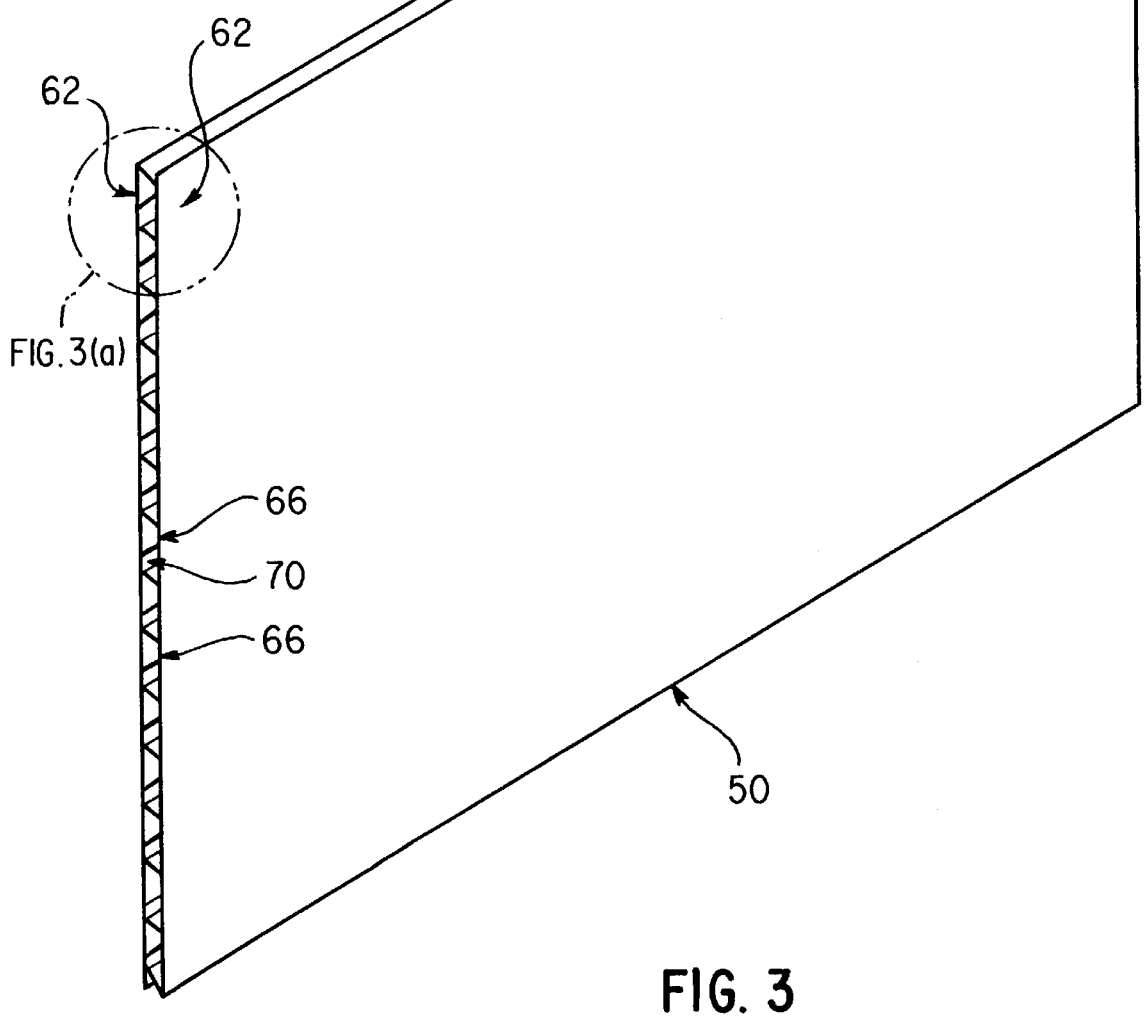

FIG. 3 illustrates a partial perspective side view of a multi-pass flow circuit 66 in the form of corrugated board 50 that can be used to make either a flat-plate absorber or a flat-plate evaporator. As shown in FIG. 3, the corrugated board 50 comprises three thin plates 62, 64, two of which are essentially flat plates 62 and form the outer surfaces of the board 50, and a third corrugated plate 64 which is not parallel to the sides of the board 50. The third plate 64 is typically folded, molded, stamped or otherwise formed so that when it is inserted between the first two plates 62, it maintains the outer plates 62 parallel to each other while forming flow channels 70 therebetween that run the full length of the board 50. The three thin plates 62, 64 can be glued, welded, soldered, brazed or fused together at their points of contact to form a more rigid structure. When corrugated board 50 is used to make the plates of either an evaporator or absorber, a multi-pass flow circuit can be made within the plates 62, 64 by cutting out turning regions 52 only in the central corrugated plate 50 before the three plates 62, 64 are joined together.

Figure 4:
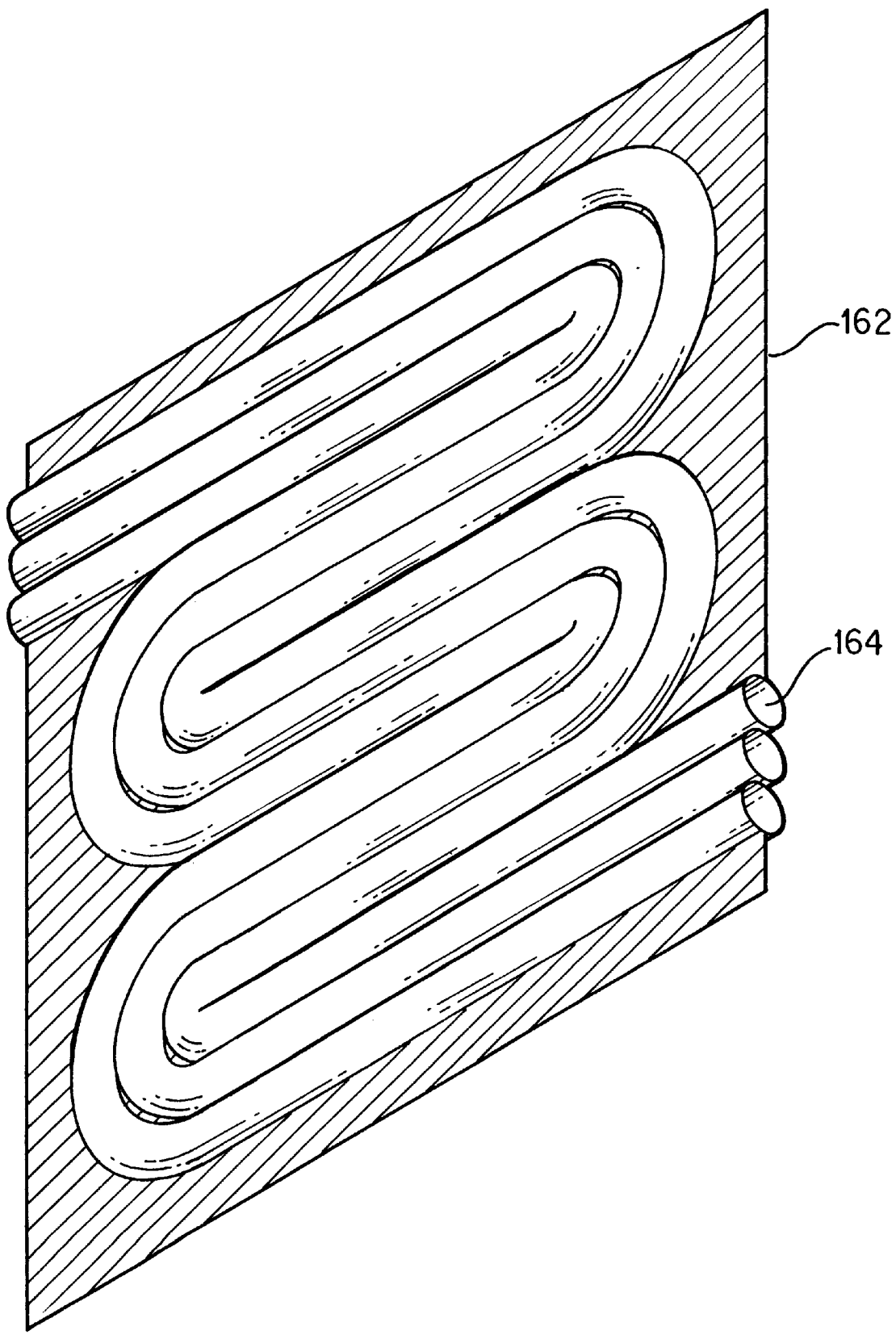
FIG. 4 is a partial perspective side view of a portion of still another preferred embodiment.

FIG. 4 illustrates a partial perspective side view of multiple channels 164 that are formed between two sheets 162. The sheets 162 are either thermoformed, molded, pressure formed or stamped and can be used to make either a flat-plate absorber or a flat-plate evaporator. As shown, the plates 10 in FIG. 1 can also be made from two thermoformed, molded, pressure formed or stamped sheets 162 that are shaped so that one or more flow channels 164 are formed when the sheets are joined together.

Figure 5:
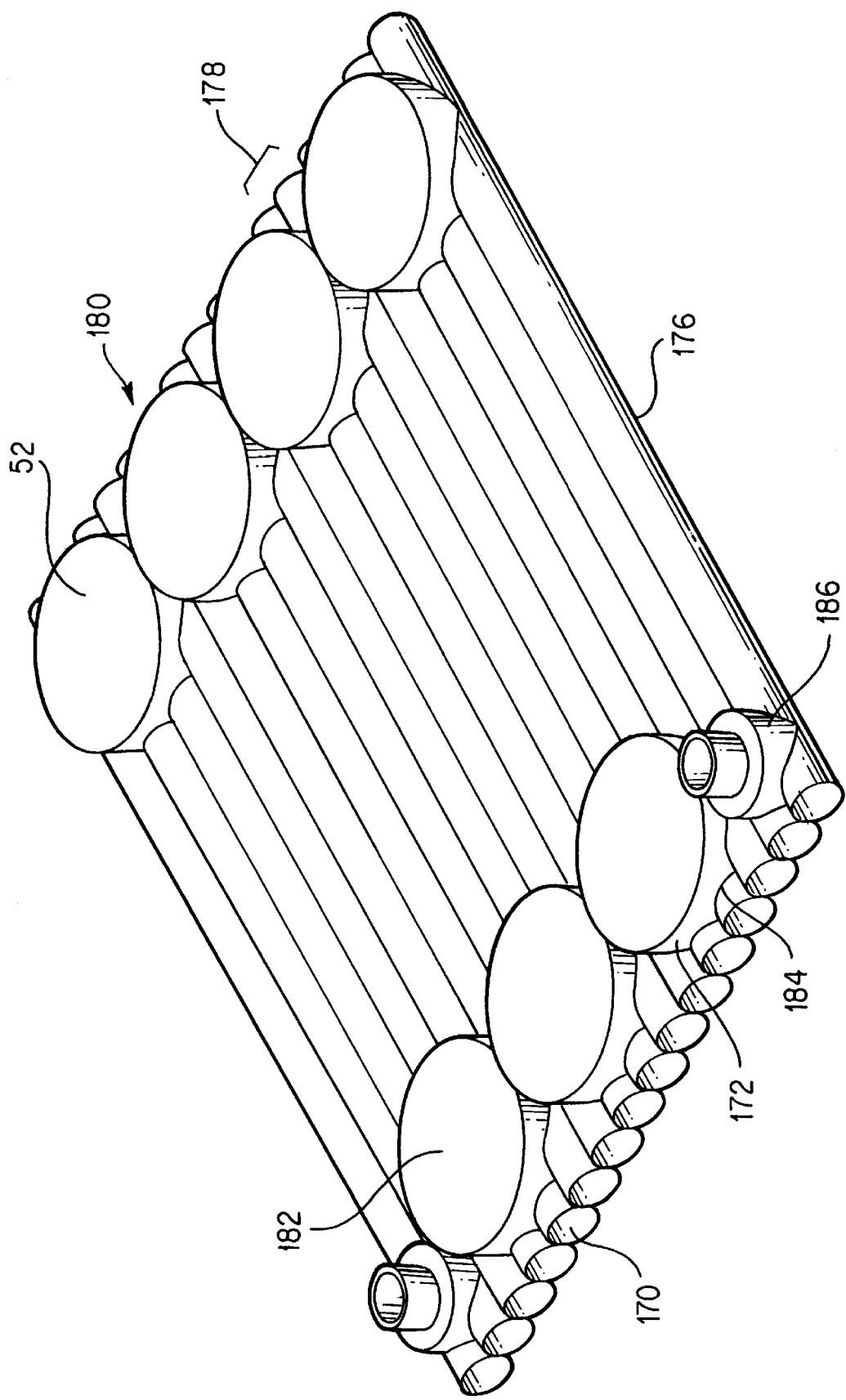
FIG. 5 is a perspective view of a portion of another preferred embodiment.

FIG. 5 illustrates a perspective view of a plate 176 with multiple channels 178 that is made from individual tubes 170 that are joined together and that can be used to make either a flat-plate absorber or a flat-plate evaporator. As shown, the plates 10 in FIG. 1 can also be made from multiple tubes 170 that are aligned so that they are parallel to each other and lie in the same plane to form a tube sheet 180. Each tube 170 touches its neighboring tubes 170 along its length, and may or may not be joined to its neighboring tubes 170 by soldering, welding or other means. When a tube sheet 180 is used to make the plates of either an evaporator or absorber, a multi-pass flow circuit 182 can be made by cutting out turning regions 52 in the tube sheet 180 and attaching caps 172 to the front and back surfaces of the tube sheet 180 covering the turning regions 52. The surfaces 184 of the caps 172 that are joined to the tube sheets 180 should have a contour that matches that of the tube sheet 180. A similar construction to the turning regions 52 creates manifolds 186 that introduce fluid into and remove fluid from multiple tube sheets 180 that are used to form a multi-plate evaporator or absorber.

Figure 6:
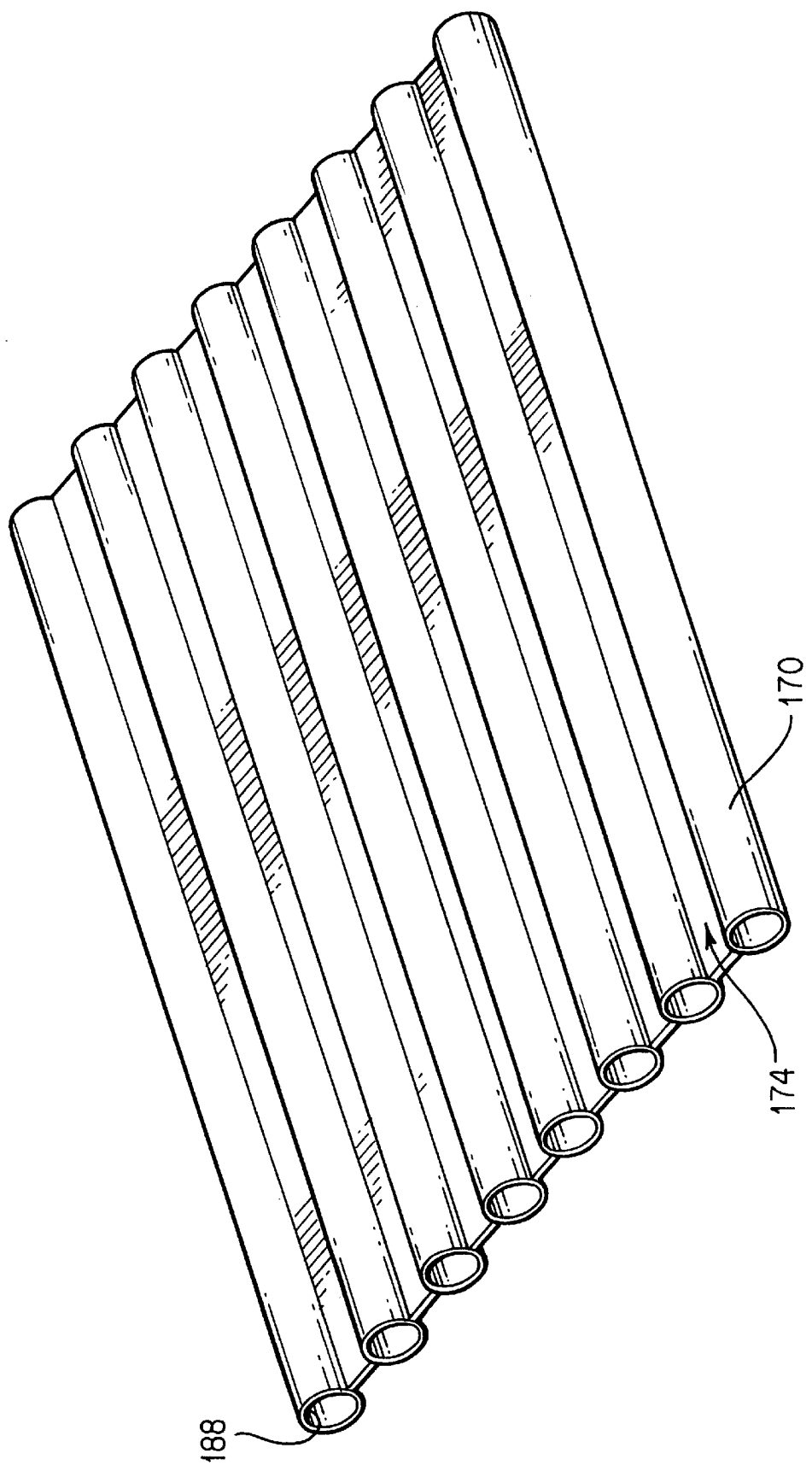
FIG. 6 is a perspective view of a portion of a further preferred embodiment.

FIG. 6 illustrates a perspective view of a plate with multiple channels that is made from individual tubes 170 that are spaced apart with thin webs 174 connecting the individual tubes 170 to each other that can be used to make either a flat-plate absorber or a flat-plate evaporator. As shown, the tubes 170 are joined to form the tube sheet 180 and are spaced apart with thin webs 174 therebetween. The webs 174 allow the liquid films that flow down the vertical surfaces of the absorber or evaporator to move from one tube 170 to the next without breaking into droplets. The webs 174 also provide additional surface area for heat and mass transfer. The plate walls 188 are relatively thin compared to conventional tube walls. The plate walls 188 are typically less than about 20 mils thick, preferably in the range of from about 6 mils to 20 mils, as compared to 40 mils for conventional tubes. Use of thinner walls 188 is workable because (1) the plate forms a more rigid structure than an individual tube and (2) the passages within the plates have a smaller cross-flow dimension than that of individual tubes, thus permitting the passages within the plate to withstand larger pressures without bursting.

Referring again to FIG. 1, a heat transfer fluid (e.g., water from a cooling tower in the case of an absorber) enters the heat exchange assembly 8 through an inlet 12 and leaves through an outlet 14. The heat transfer fluid is brought in flow communication with all plates 10 via connecting tubes 16. The circuit for the heat transfer fluid through each plate 10 is identical. Using the front plate 10 in FIG. 1 as illustrative, the flow that enters the plate 10 through the inlet 12 first flows through the three channels 22a, 22b, 22c that intersect the inlet 12. The heat transfer fluid flows through channels 22a, 22b, 22c until it encounters the circular cutout 28a at the end 24 of the plate 10 that is opposite the end 26 with the inlet 12. The heat transfer fluid is prevented from leaving the plane of the plate 10 by cover sheets 33 that cover both sides of the cutout 28a. The front cover sheet 33 is shown in FIG. 1 in cut-away format so that the circular cutout 28a can be seen. The cover sheets 33 are attached to the plate 10 by welding, gluing, soldering or brazing. The heat transfer fluid is also prevented from continuing past the cutout 28a and leaving the plate 10 through the plate end 24 by sealing the openings 29 of the channels 22a, 22b and 22c in the end 24, including (1) plugging the openings 29 with filler material; (2) crimping, crushing, welding or fusing closed the openings 29; or (3) gluing, welding, brazing or soldering the cover sheet 33 over the openings 29. Since the heat transfer fluid cannot leave the plate 10 either through the cutout 28a or the plate end 24, the heat transfer fluid must turn 180° and enter the three channels 22d, 22e and 22f. The heat transfer fluid flows through channels 22d, 22e and 22f until it encounters the next cutout 28b. Again, the heat transfer fluid turns 180° in this cutout 28b and enters the next three channels. The heat transfer fluid continues to travel through the plate 10 until it reaches the outlet 14, whereupon it enters the outlet 14 and leaves the plate 10. In order to maintain approximately equal flow of heat transfer fluid through each plate 10, it is preferable to attach the inlet 12 to a plate 10 that is at one end of the heat exchange assembly 8 and the outlet 14 to a plate 10 that is at the opposite end of the heat exchange assembly 8.

For the absorber 8 shown in FIG. 1, the absorbent (i.e., a liquid that absorbs the refrigerant vapor) must be distributed across the top edge 30 of each plate 10 so that the absorbent flows as a fairly uniform liquid film down both sides of each plate 10. It is desirable that means for distributing the absorbent 31 (1) deliver an equal amount of absorbent to each plate 10; (2) spread the absorbent uniformly across the top edge 30 of the plate 10; (3) cause equal amounts of absorbent to flow on each side of the plate 10; and (4) deliver the absorbent to the plate 10 without creating droplets.

Although the means for distributing the absorbent 31 can be separate from the heat exchange assembly 8, it is preferred to use the topmost channels 22g, 22h of each plate 10 as means for distributing the absorbent 31. In FIG. 1, distribution holes, slots or slits 32 are made in the two topmost channels 22g, 22h. The holes, slots or slits 32 are made in both outer walls 30 of each plate 10 so that the absorbent will flow onto both sides of each plate 10.

The absorbent enters the channels 22g, 22h of the front plate 10 through the absorbent inlet 34. The opening 35 in the absorbent inlet 34 intersects the two topmost channels 22g, 22h of the front plate 10. Absorbent connecting pipes 36 intersect the two topmost channels 22g, 22h in the other plates 10 of the heat exchange assembly 8. Absorbent that enters the heat exchange assembly 8 through the absorbent inlet 34 splits as it flows through the absorbent connecting pipes 36 so that an approximately equal amount of absorbent is delivered to each plate 10.

Figure 7:
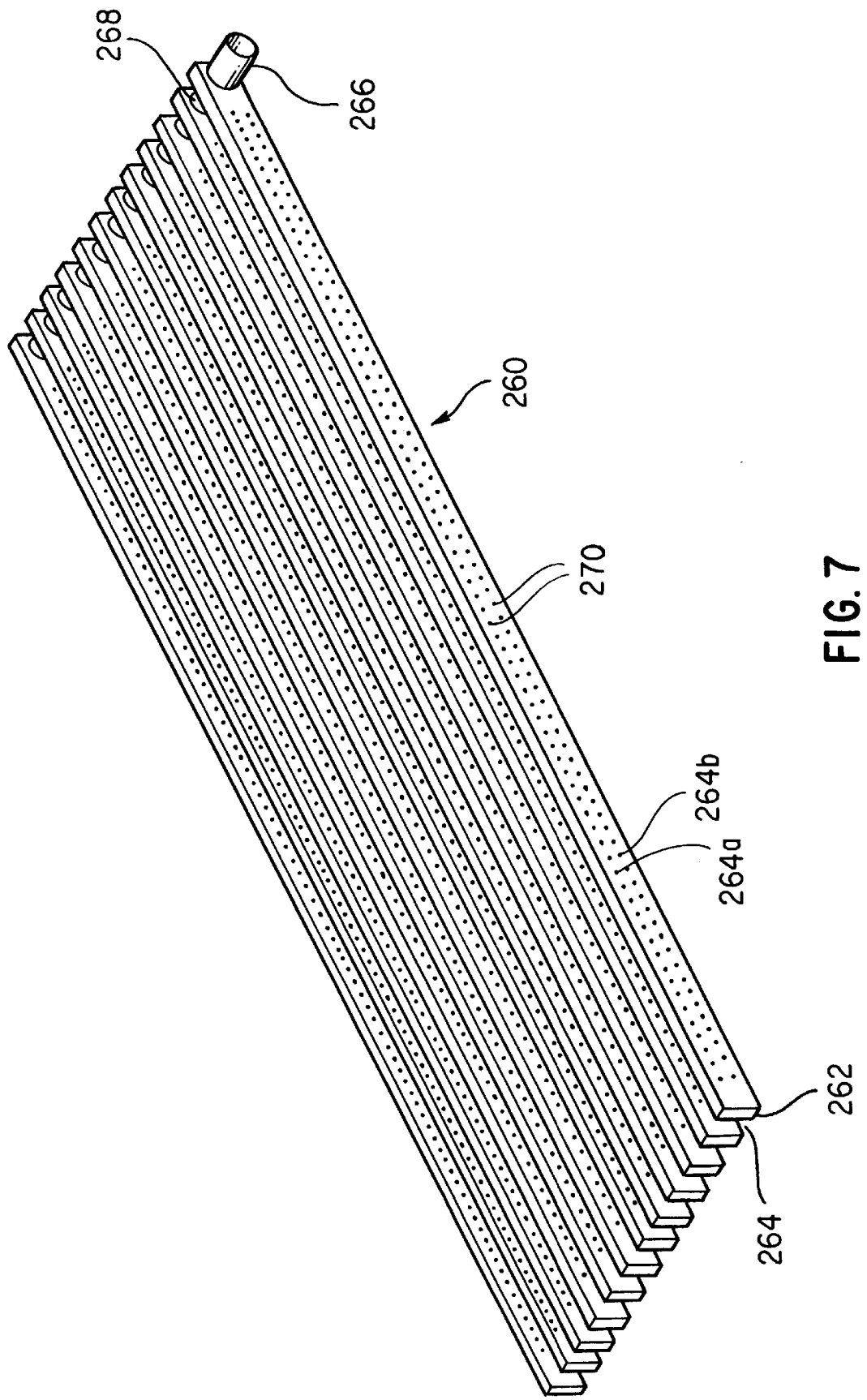
FIG. 7 is a perspective view of a portion of another preferred embodiment.

FIG. 7 illustrates a perspective view of a separate distributor for either absorbent or refrigerant. An absorbent distributor assembly 260 is separate from the heat exchange assembly 8. The plates 262 of the distributor assembly 260 have internal channels 264 similar to the channels 22 that are shown in the plates 10 of the heat exchange assembly 8 in FIG. 1. The plates 262 of the distributor assembly 260 can be made from profile board, corrugated board, individual tubes or boards with internal channels made from thermoformed, molded, pressure-formed or stamped sheets. The two channels 264a, 264b in each plate 262 are in flow communication with the absorbent inlet 266 and absorbent connecting pipes 268. These two channels 264a, 264b have holes, slots or slits 270 through which the absorbent can leave the channels 264. These holes, slots or slits 270 are identical to the aforementioned holes, slots or slits 32 in FIG. 1.

In order for the distributor assembly 260 to distribute absorbent onto the plates 10 of an absorber 8, the plates 262 of the distributor assembly 260 must be interleaved with the plates 10 of the absorber 8. The plates 262 in the distributor assembly 260 should be designed so that the thickness of the distributor plates 262 is slightly less than the distance between the plates 10 of the absorber assembly 8. This will allow absorbent to flow directly from the distributor 260 onto the plates 10 of the absorber 8 without the creation of droplets.

The absorber 8 shown in FIG. 1 and the absorbent distributor 260 shown in FIG. 7 can function as an evaporator and a refrigerant distributor, respectively. Likewise, the absorber 8 shown in FIG. 1 and the absorbent distributor 260 shown in FIG. 7 can be used in applications other than an absorption heat pump, where a gas is absorbed by an absorbent. One example of such an application is a dehumidifier, in which air flows between the plates 10 of the absorber 8 and absorbs water vapor from the air. Another example is an evaporative cooler, in which a liquid to be cooled flows within the plates 10 and water evaporates on the surface of the plates 10.

In a conventional absorption heat pump, the absorber and the evaporator are within the same vacuum shell but located in separate places within the shell. The refrigerant vapor that is formed as the liquid refrigerant evaporates on the surface of the evaporator flows to the absorber where it is absorbed by the absorbent. Additional volume must be provided within the vacuum shell so that the refrigerant vapor can flow freely between the evaporator and the absorber. If the velocity of the refrigerant vapor becomes too high, an unacceptably high pressure drop can be created, which degrades the performance of the absorption heat pump. Also, high vapor velocities are more likely to carry droplets of refrigerant from the evaporator to the absorber, which again degrades the performance.

The flat-plate absorber shown in FIG. 1 and a similarly constructed evaporator can be located in separate places within the vacuum shell of an absorption heat pump, as are the conventional tubular absorber and evaporator. However, a much more compact system can be made by interleaving the plates 200 of the absorber 202 with the plates 220 of the evaporator 222 as is shown in FIG. 8.

Figure 8:
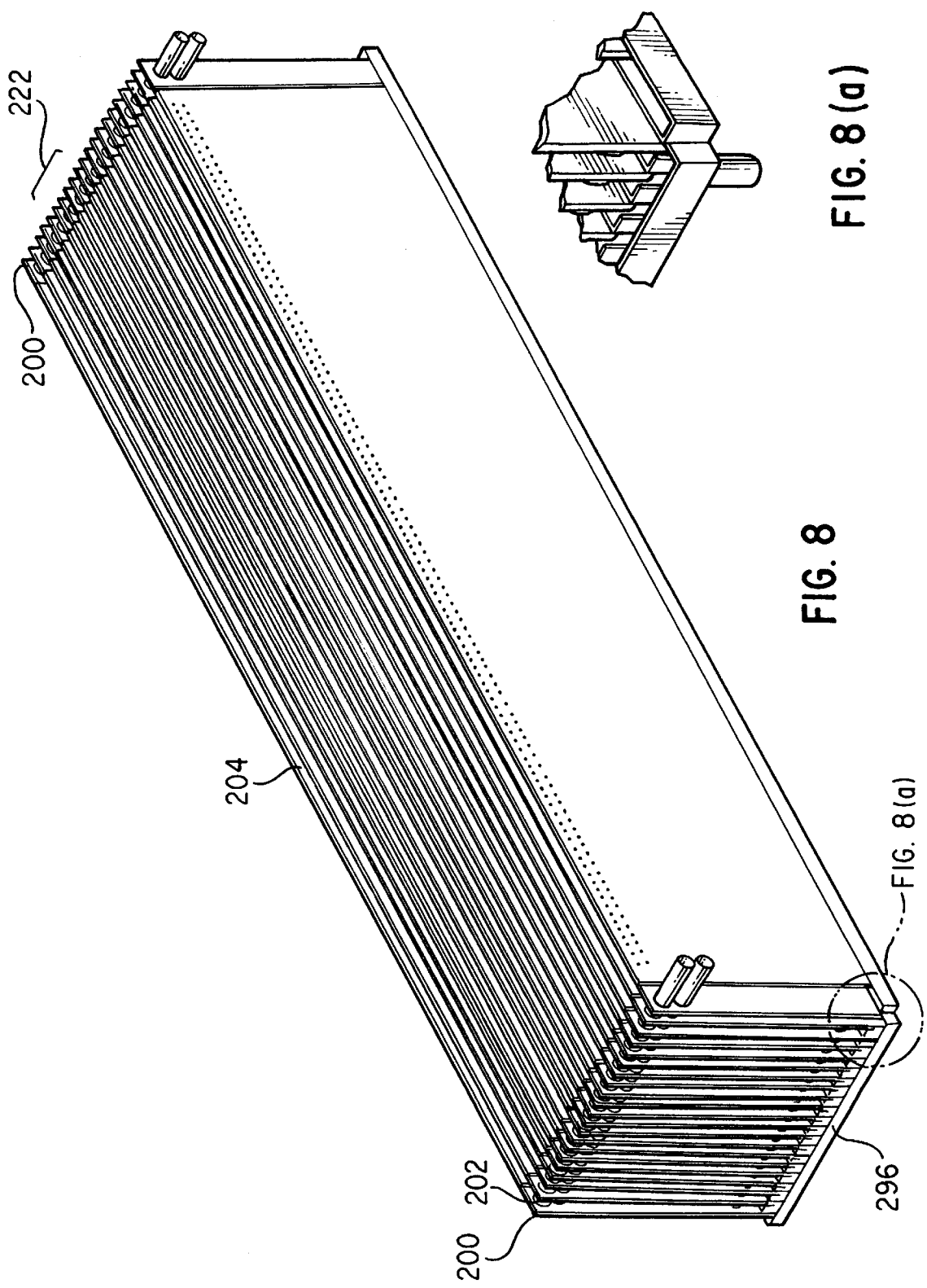
FIG. 8 is a perspective view of a portion of another preferred embodiment.

FIG. 8 illustrates a perspective view of a flat plate 202 absorber and a flat plate evaporator 222 that are interleaved so that the surfaces of the absorber 202 are directly opposed to the surfaces of the evaporator 222. The plates 200 of the absorber 202 are positioned midway between the plates 220 of the evaporator 222. The refrigerant vapor that evolves on the evaporator plates 220 flows to the absorber plates 200 across the narrow gap 204 between the two sets of plates 200, 220. In the interleaved configuration shown in FIG. 8, the volume within a vacuum shell containing the plates 200, 220 is thereby minimized.

Three potential problems must be overcome to use the interleaved absorber/evaporator in FIG. 8 in a practical absorption heat pump. The first problem is that conductive and radiative heat transfer between the closely positioned evaporator 220 and absorber plates 200 cannot be allowed to degrade the performance of the absorption heat pump. Under typical operating conditions, the temperature of the evaporator plate 220 surface would be about 40° F. and the temperature of the absorber plate 200 surface would be about 120° F. Because the absorber plate 200 is hotter than the evaporator plate 220, heat will tend to flow from the absorber 202 to the evaporator 222. This flow of heat will degrade the performance of the absorption heat pump.

Heat transfer between the absorber 200 and evaporator 220 plates can be kept to a minimum. For example, for a 40° F. evaporator plate 220 temperature and a 120° F. absorber plate 200 temperature in which the heat transfer is occurring in a vapor that is flowing counter to the direction of heat conduction, the conductive heat transfer was estimated to be less than 6 Btu/h-ft$^2$ for a 4 mm gap 204 between the evaporator 222 and the absorber 202. Since the total cooling effect on the evaporator 222 due to the evaporation of the refrigerant is on the order of 1,000 to 4,000 Btu/h-ft$^2$, the heat transfer due to conduction is negligible.

To the contrary, radiative heat transfer between the plates 200, 220 of an interleaved absorber 202 and evaporator 222 may be more significant. If so, a heat radiation shield may be installed in the gap between the absorber and evaporator plates. Preferably, this shield is part of the spacer installed between the plates to keep a uniform spacing.

Again as shown in FIG. 8, the proximity of the absorber 200 and the evaporator 220 plates permits the cross flow of refrigerant and absorbent between the two surfaces 200, 220. By covering the plate surfaces 200, 220 with woven and/or non-woven wicks, absorption to and evaporation from the plate surfaces is minimized. However, flashing can occur when warm absorbent or refrigerant is first delivered to the plates, which would then create droplets that could be carried to the opposite surface.

It is important to separate the absorbent and the refrigerant that flows off the plates of the absorber 200 and evaporator 220. In FIG. 8, the bottom of each plate 200, 220 is contained in an individual trough 296. All the troughs 296 that collect absorbent drain into a common conduit (not shown) for the absorbent. Similarly, all the troughs 296 that collect refrigerant drain into a common conduit (not shown) for refrigerant.

Figure 9:
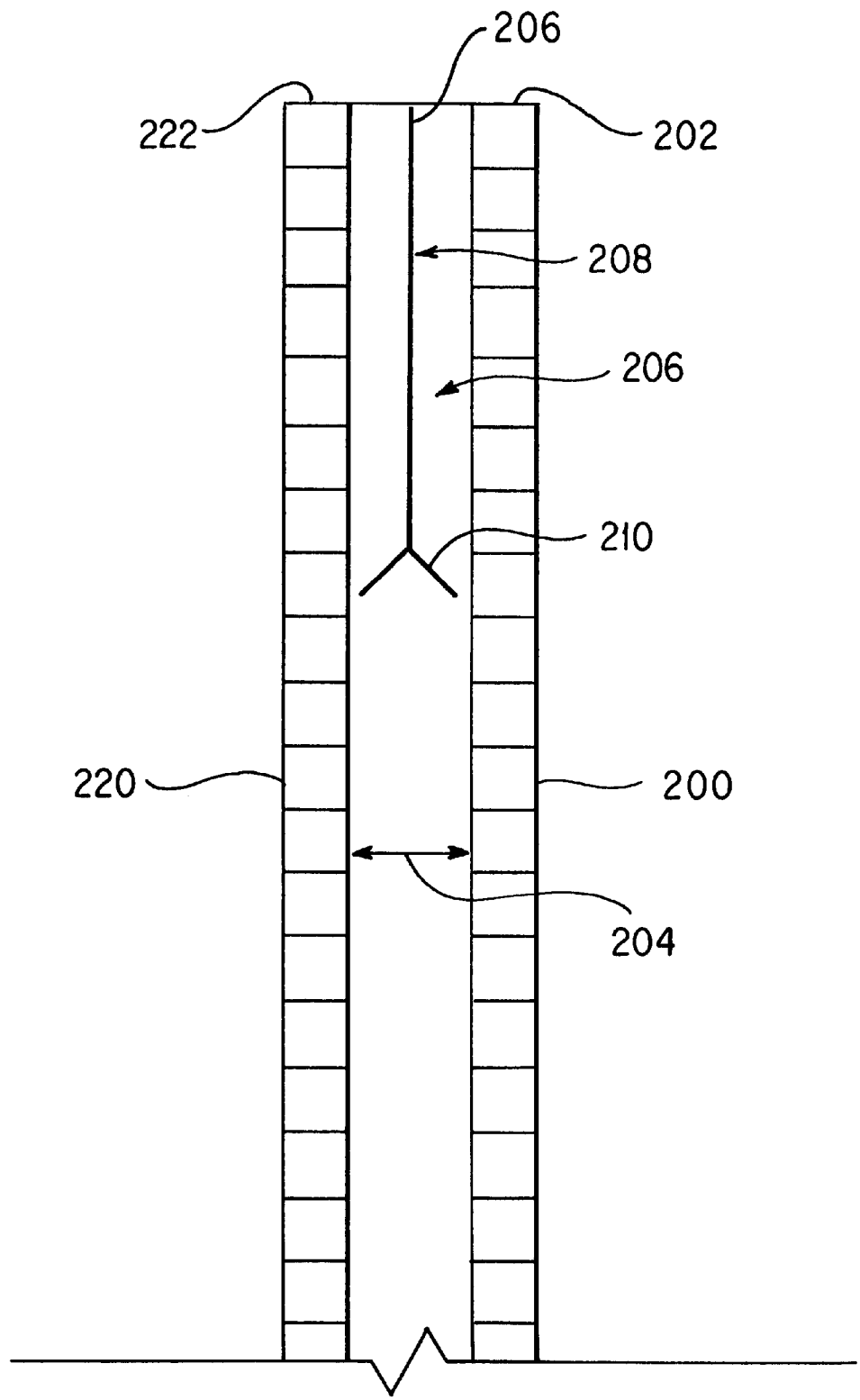
FIG. 9 is a partial cross-sectional view of a portion of another preferred embodiment.

FIG. 9 illustrates a partial cross-sectional view of an absorber plate 200 and an evaporator plate 220 that are directly opposed and use a separator 206 in the region where the refrigerant and the absorbent are distributed on the plates 200, 220 to prevent droplets of either the refrigerant or absorbent from splashing onto the opposite plate 220, 200. Initial flashing of either absorbent or refrigerant can be controlled by providing the absorber 200 and evaporator 220 plates with an accommodation region 208 at their top. As shown in FIG. 9, this accommodation region 208 has a partition 210 in the gap 204 between the plates 200, 220. This region 208 is designed so that all droplets caused by flashing are collected by the partition 210 and directed back to the appropriate plate 200, 220. The separator 206 is located approximately equidistant between the opposing plates 200, 220.

Figure 10:
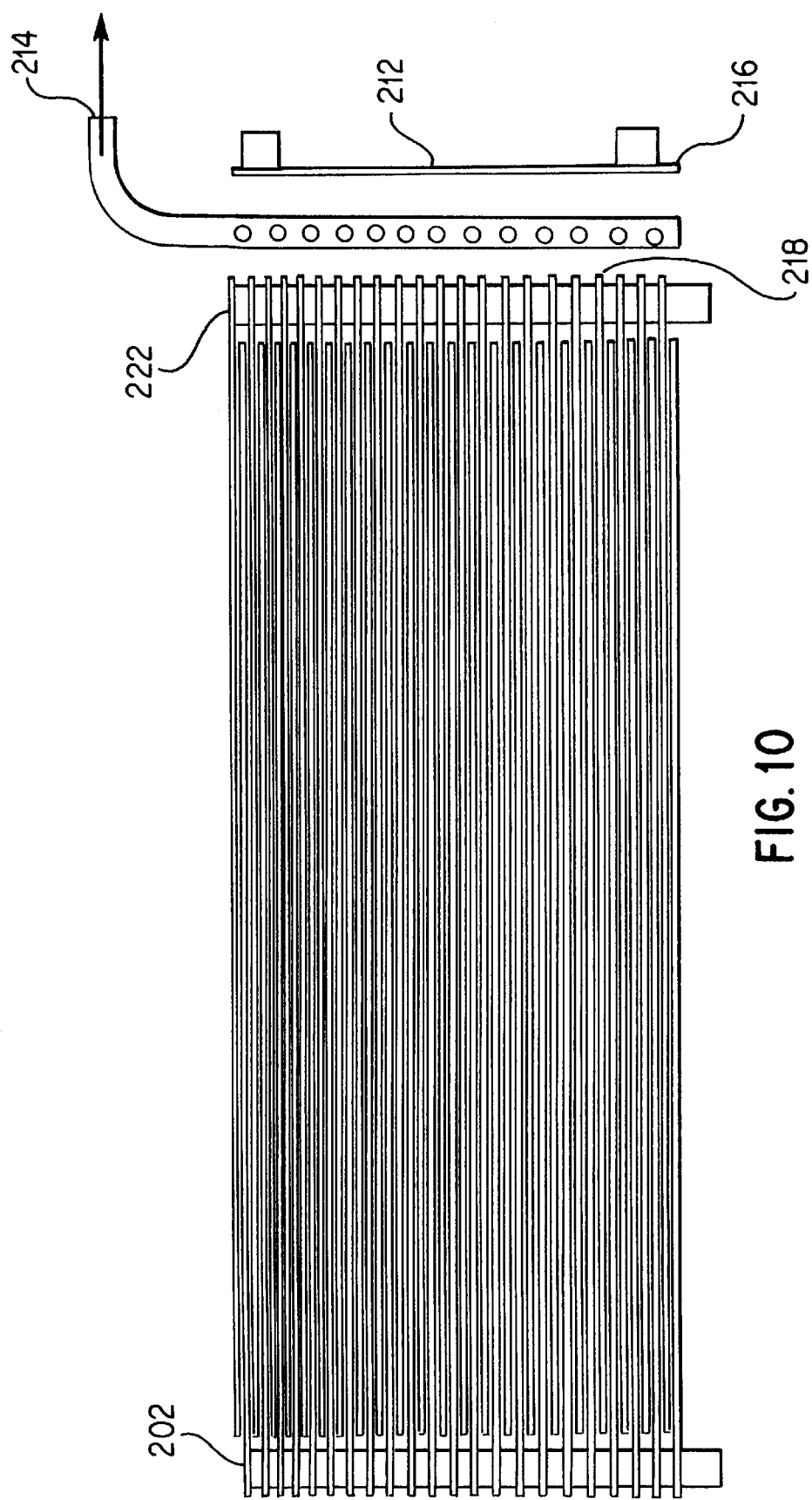
FIG. 10 is a schematic top view of a portion of another preferred embodiment.

FIG. 10 illustrates a schematic top view of an interleaved flat plate absorber 202 and evaporator 222 that use a small separate absorber 212 to induce the migration of non-condensible gases towards a purge port 214. To enable the vacuum shell containing an interleaved absorber/evaporator 202/222 to be purged, a small purge absorber 216 is provided at the end of the pack 218 of absorber/evaporator plates 200/220. This purge absorber 216 creates a drift of refrigerant vapor towards itself that sweeps non-condensible gases to this region. A purge port 214 in this region removes the non-condensible gases from the vacuum shell.

Figure 11:
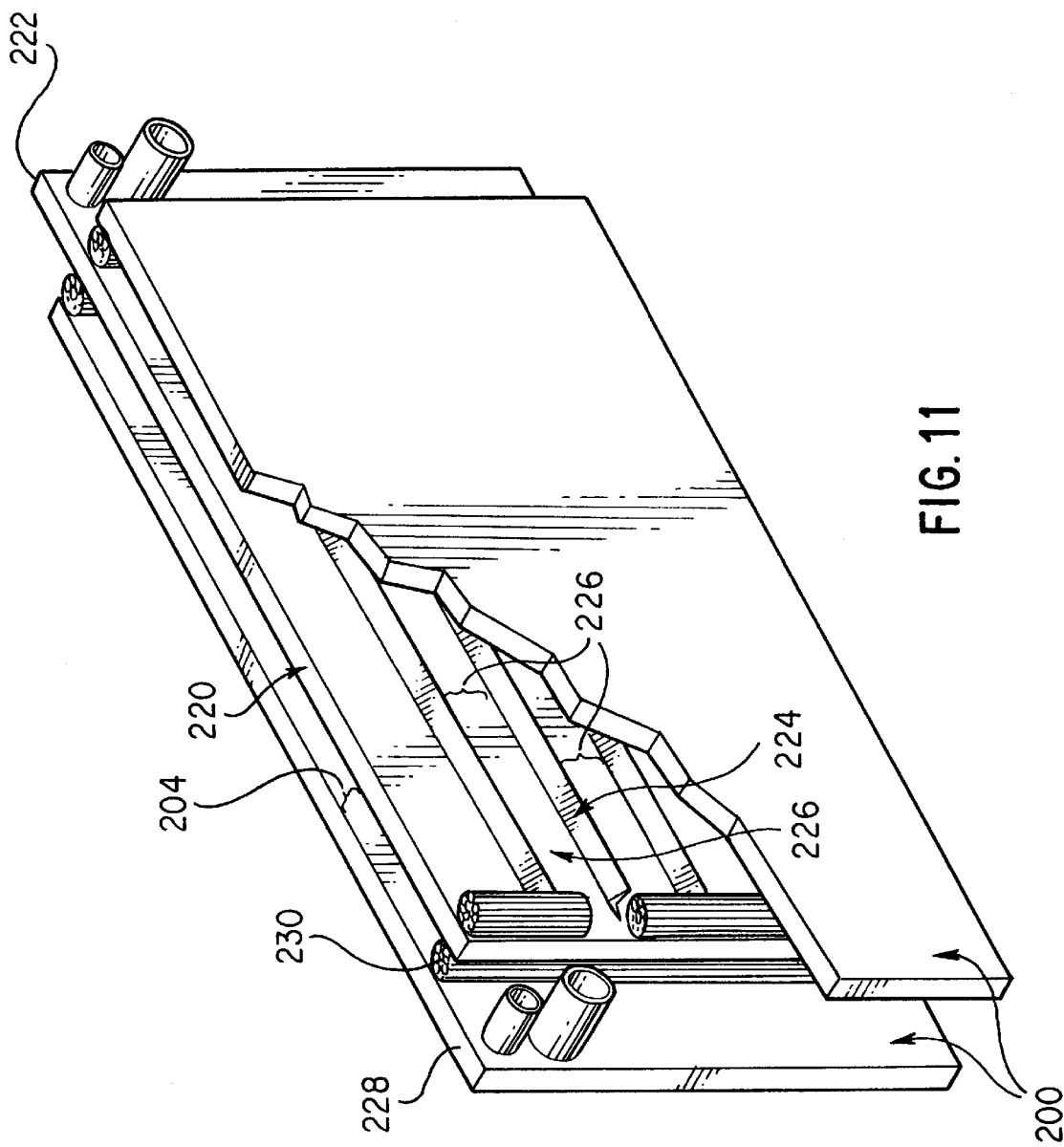
FIG. 11 is a partial cross-sectional view of a portion of another preferred embodiment.

FIG. 11 illustrates a partial cross-sectional, cut-away view of an absorber plate 200 and an evaporator plate 220 that are directly opposed and use a series of partitions 224 to create a pressure gradient in the refrigerant vapor in the vertical direction between the plates 200, 220. Thus, the change in the equilibrium vapor pressure of the absorbent as it flows down the surface of the absorber plate 200 is exploited to increase the driving potential for heat and mass transfer between the evaporator 222 and the absorber 202. Only two absorber plates 200 and one evaporator plate 220 are shown, although it is understood that both the absorber 202 and evaporator 222 may comprise many plates 200, 220 (as shown in FIG. 8). As shown in FIG. 11, the gap 204 between the evaporator plate 220 and the absorber plate 200 is subdivided by partitions 224 that run horizontally across the plates 200, 220. The partitions 224 are designed so that both the absorbent and the refrigerant can flow down the plates 200, 220 and pass from one partitioned space 226 to the next lower one 226 with little resistance, but the refrigerant vapor cannot easily flow between the partitioned spaces 226. To insure that refrigerant vapor cannot easily flow between partitioned spaces 226, it is necessary to prevent vapor from flowing around the ends 228 of the partitions 224. Thus, a cover or filler material 230 is applied over the end regions 228. Since the refrigerant vapor cannot easily flow between partitioned spaces 226, the partitioned spaces 226 can be maintained at different pressures. Since the refrigerant will evaporate at a different temperature when its vapor pressure changes, each partitioned space can operate at a different evaporator temperature.

The benefits presented by a partitioned interleaved absorber/evaporator are shown in the following example for an absorption chiller that uses a solution of lithium bromide as the absorbent. For a conventional lithium-bromide absorption chiller, the absorbent is sprayed or dripped onto the absorber at a concentration of 62% and drips off at a concentration of 57%, and the cooling water enters the absorber at 85° F. and leaves at 95° F. Under these conditions, the vapor pressure of the refrigerant within the vacuum shell that contains the absorber and the evaporator is about 6 mm Hg, which corresponds to a saturation temperature of 39° F. Since the entire vacuum shell is maintained at this pressure, all evaporation of refrigerant on the surfaces of the evaporator occurs at a temperature that is no lower than the 39° F. saturation temperature.

However, the combination of the most concentrated absorbent and the coldest cooling water (62%, 85° F.) will be in equilibrium with refrigerant at a saturation temperature of 12.3° F. In a conventional absorption chiller, this very low temperature cannot be exploited because the entire vacuum shell must operate at a common pressure, which will be determined by an average absorbent concentration and cooling water temperature. The partitioned, interleaved absorber/ evaporator can exploit the very low saturation temperature by flowing the cooling water into the top of the absorber plates and removing it from the bottom, and by flowing the water that is to be chilled in the evaporator into the bottom of the evaporator plates and removing it from the top. In this arrangement, the most concentrated absorbent is kept at the coldest temperature and the weakest absorbent is kept at the warmest temperature. The topmost partitioned region between the absorber and evaporator plates will therefore be at the lowest saturation temperature, the saturation temperature increasing in subsequently lower partitioned regions. Since the water that is to be chilled is flowing upward into regions that have lower saturation temperatures, a counter-flow exchange of heat is created. Based on prior experience with heat exchangers, a counter-flow configuration will have the highest effectiveness (i.e., it will have the highest heat transfer rate for a given surface area and fluid flow rates). Therefore, the partitioned interleaved absorber/evaporator can be used to either chill a given flow of water to a lower temperature, or reduce the size of an absorption chiller that provides a specified cooling rate.

Purging non-condensible gases in a partitioned interleaved absorber/evaporator is made much more difficult by the presence of the partitions 224 and the filler material 230 that seal the end regions 228 of the plates 200, 220, since it is not possible to draw the non-condensible gases towards a common point (as is done by the small purge absorber 212 in FIG. 10). If the evolution rate of non-condensible gases is not too large, two methods are available for purging non-condensible gases from the partitioned regions 226. The first method uses the absorbent to remove the non-condensible gases. The absorbent is first stripped of non-condensible gases before it is delivered to the plates 200 of the absorber 202. Since the absorbent has essentially no non-condensible gases dissolved in it, it will absorb non-condensible gases that may be present in the partitioned regions 226 between the absorber 200 and evaporator 220 plates. As the absorbent moves down the absorber plates 200, its concentration decreases which will increase its ability to absorb additional non-condensible gases. The non-condensible gases that are dissolved in the absorbent are removed from the absorber 202 along with the absorbent.

The second method for removing non-condensible gases can be applied only to absorbers 202 with walls 200 that are permeable to the non-condensible gases. For this class of absorbers 202, the cooling water that flows through the absorber 202 is first stripped of non-condensible gases before it enters the absorber 202. Since the cooling water has essentially no non-condensible gases dissolved in it and the walls 200 of the absorber 202 are permeable, the non-condensible gases will migrate from the partitioned spaces 226 between the absorber 200 and evaporator 220 plates to the cooling water. By this means, the concentration of non-condensible gases can be kept very low in the partitioned spaces 226 between the absorber 200 and the evaporator 220 plates.

Figure 12:
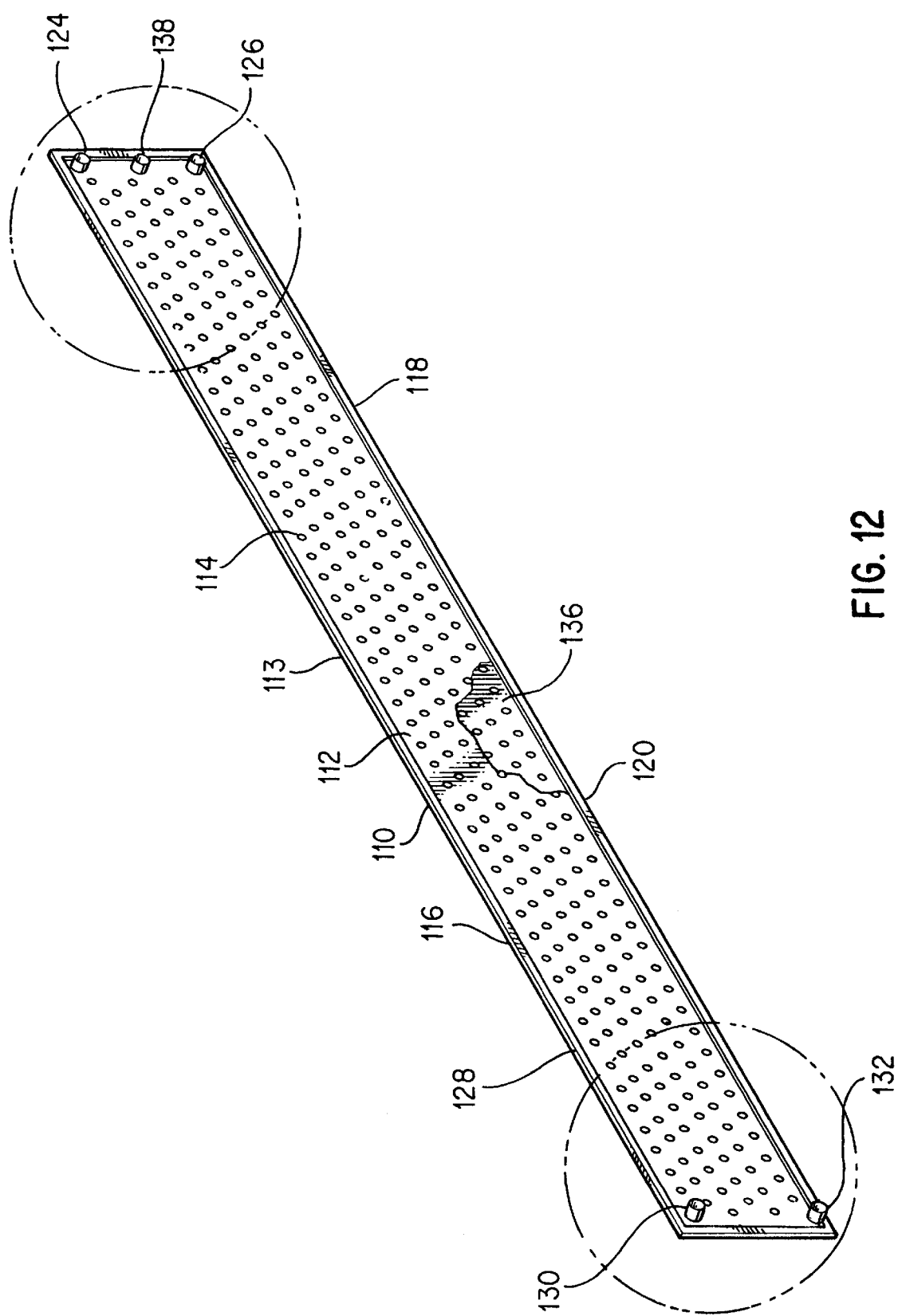
FIG. 12 is a perspective view of a portion of another preferred embodiment.
Figure 13:
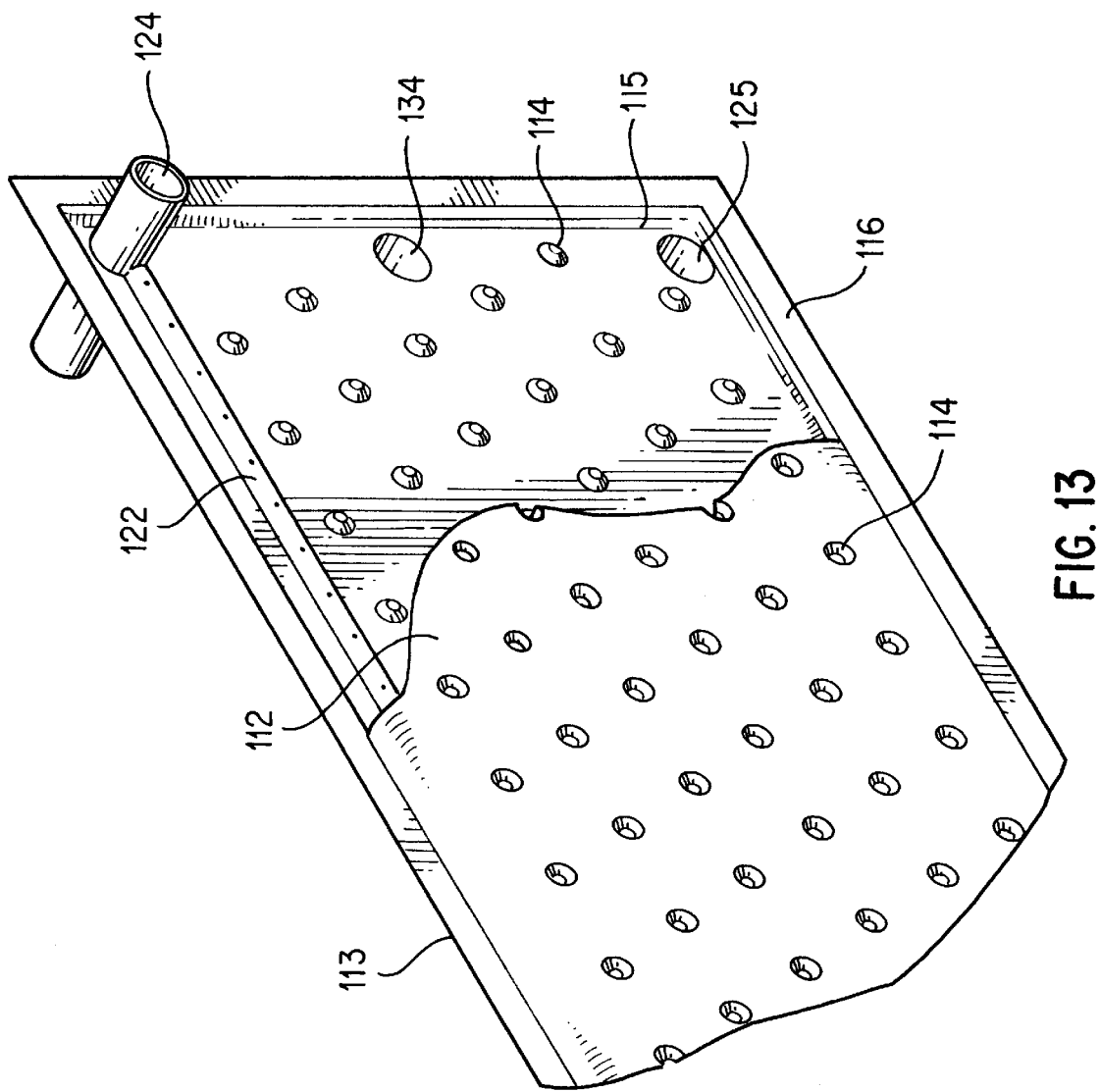
FIG. 13 is a magnified cut-away perspective of the preferred embodiment shown in FIG. 12.
Figure 14:
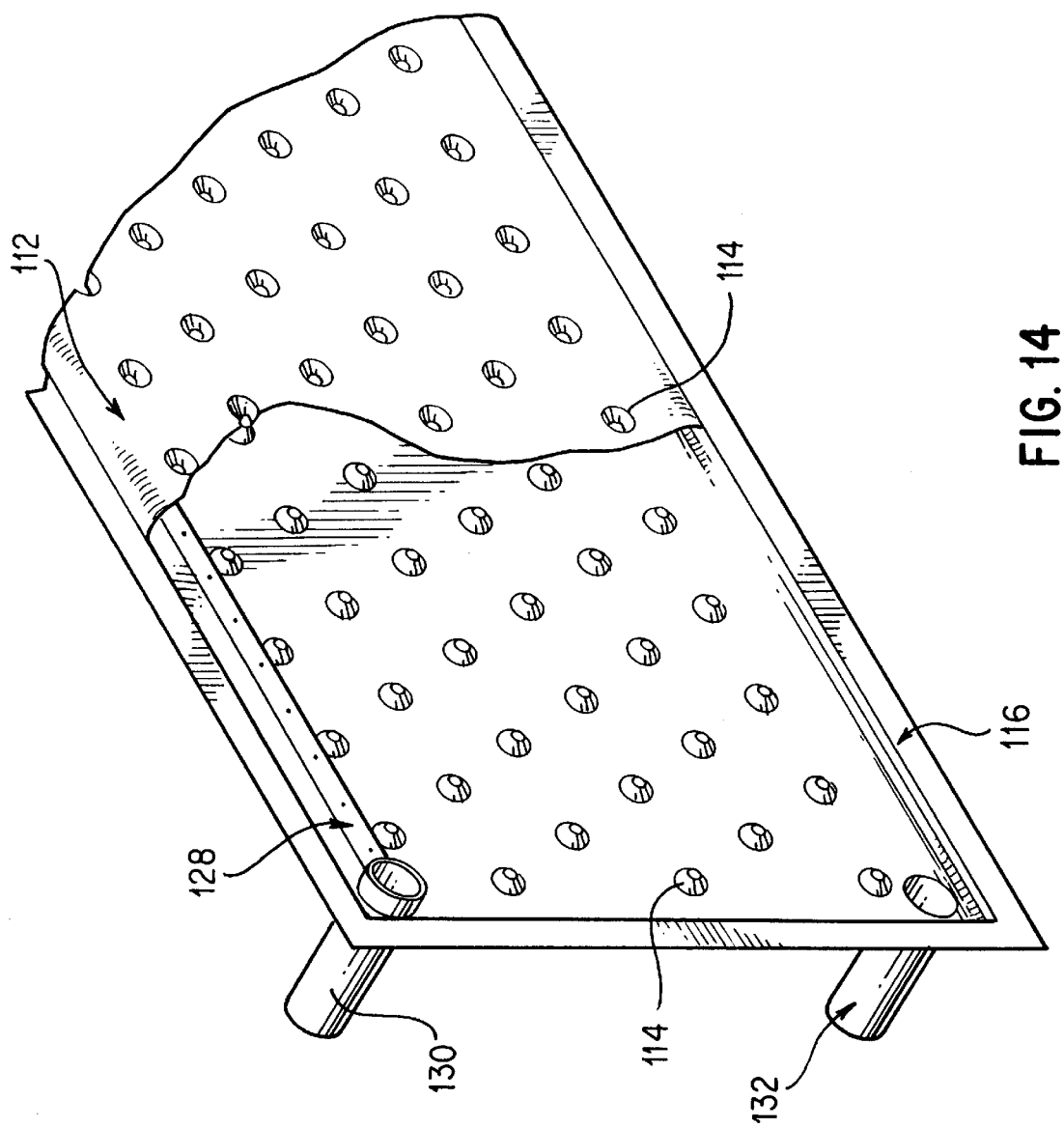
FIG. 14 is a magnified cut-away perspective of the preferred embodiment shown in FIG. 12.

FIG. 12 illustrates a perspective view of a flat plate absorber and evaporator that are configured as an evacuated panel 110 that can use air as the heat transfer fluid on the exterior side. A panel 110 is composed of two walls 112. The walls 112 are made of a strong metal such as steel that is either corrosion-resistant or coated so that it is protected from corrosion. The walls 112 are maintained a uniform distance apart (typically 0.25" to 0.5") by either separate spacers or dimples 114 that have been stamped into the walls 112. In FIGS. 12, 13 and 14, conical dimples 114 that are truncated perpendicularly to their axes are used to maintain a uniform distance between the walls 112. The dimples 114 on one wall 112 are positioned so that they are in contact with the dimples 114 on the other wall 112 when the two walls 112 are placed together.

The volume enclosed by the two walls 112 is isolated from the outside by either attaching the edges 113 of the two walls to a common frame 115 or, as shown in FIGS. 12, 13 and 14, shaping the edges 113 of the plates 200, 220 so that a sealing region 116 is formed. When the two walls 112 are placed together, the two sealing regions 116 overlap. The volume between the walls 112 is permanently isolated from the outside by either welding, brazing, soldering, gluing or otherwise joining the two walls 112 where their sealing regions 116 overlap.

FIG. 13 illustrates a magnified cut-away perspective of the absorber end of the evacuated panel 110 that is shown in FIG. 12. The panel 110 has an absorber region 118 and an evaporator region 120 (shown in FIG. 12). An absorbent distributor 122 distributes absorbent uniformly along the top edge 113 of both walls 112 in the absorber region 118. The absorbent distributor 122 comprises a metal tube that runs the length of the absorber region 118. The absorbent distributor 122 is perforated so that absorbent can flow out of the tube onto the walls 112. Absorbent enters the panel 110 through the absorbent inlet 124. The absorbent inlet 124 comprises a tube that penetrates the walls 112 of the panel 110. The outside of the absorbent inlet 114 is welded or otherwise sealed to the panel walls 112. The absorbent inlet 124 is in flow communication with the absorbent distributor 122.

The absorbent that is delivered to the top edge 113 of the walls 112 in the absorber region 118 flows down the walls 112 as a thin uniform film. The absorbent that flows to the bottom of the walls 112 leaves the panel 110 through the absorbent outlet 126. Likewise, in the evaporator region 120 of the panel 110 (see FIG. 14), refrigerant is distributed along the top edge 113 of the wall 112 by a refrigerant distributor 128. Refrigerant enters the panel 110 through the refrigerant inlet 130, which is in flow communication with the refrigerant distributor 128. The refrigerant that is delivered to the top edge 113 of the walls 112 in the evaporator region 120 flows down the walls 112 as a thin uniform film. The refrigerant that flows to the bottom of the walls 112 leaves the panel 110 through the refrigerant outlet 132.

A separating dam 136 prevents the refrigerant and the absorbent that collects at the bottom of the panel 10 from mixing. A purge port 138, comprising a tube that is welded or otherwise securely attached to the walls 112 of the panel 110 at the end of the absorber region 118 and which is in communication with the volume within the panel 110 through a hole 134 (see FIG. 13) in the wall 112, is used to remove non-condensible gases that may accumulate in the panel 110.

When incorporated into an air conditioner, the evaporator region 120 of the panel 110 is inserted in the air stream that is to be cooled (i.e., the process air) and the absorber region 118 of the panel 110 is inserted in the air stream that is used as the heat sink (i.e., the cooling air). The refrigerant that is distributed onto the panel walls 112 in the evaporator region 120 evaporates as heat is transferred from the process air to the refrigerant. The refrigerant vapor flows from the evaporator region 120 to the absorber region 118. In the absorber region 118, the refrigerant vapor is absorbed by the absorbent that is flowing down the walls 112. The heat that is released as the refrigerant vapor is absorbed is transferred to the cooling air.

Figure 15:
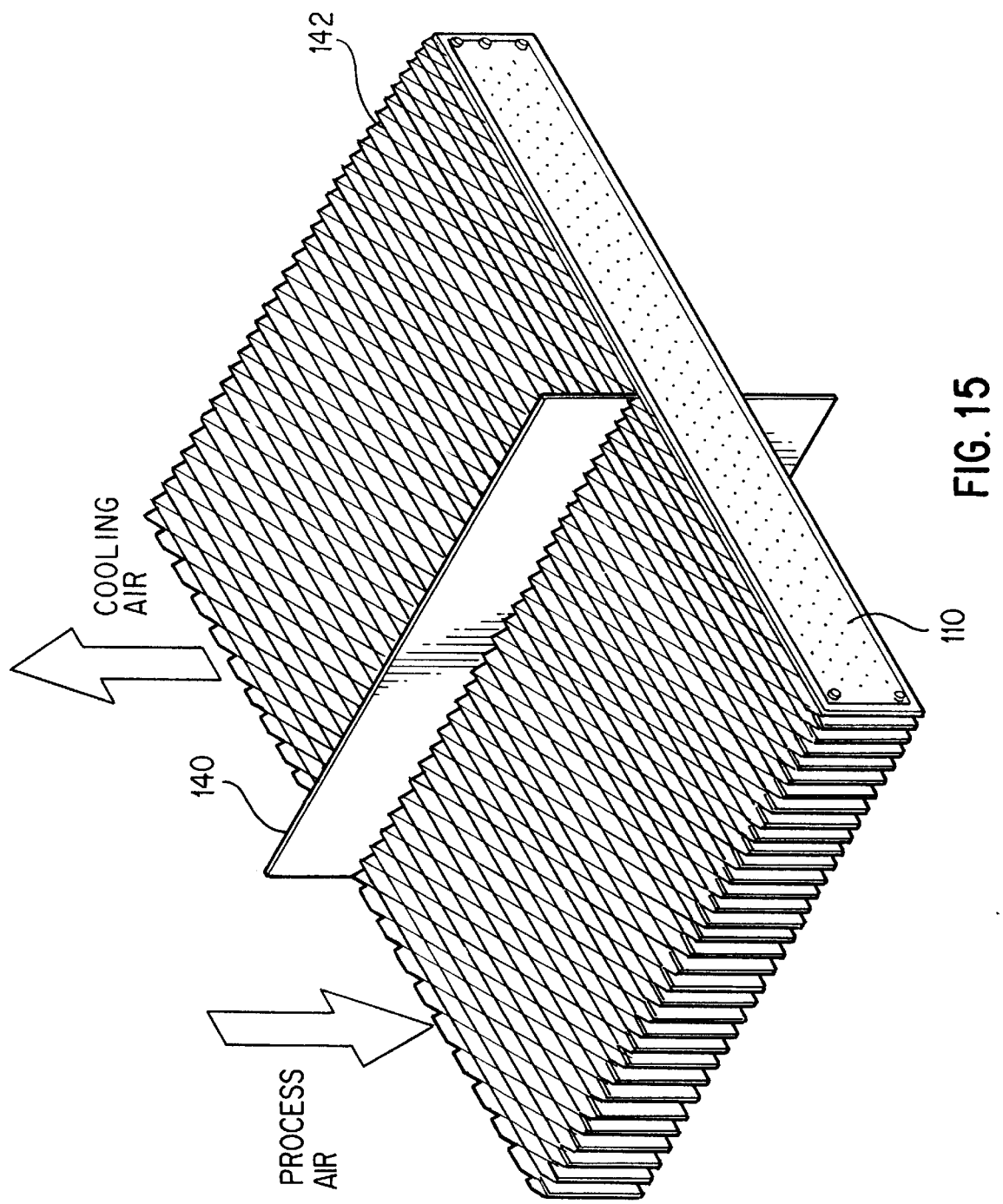
FIG. 15 is a perspective view of a portion of another preferred embodiment.

FIG. 15 illustrates a perspective view of an air-cooled absorption air conditioner that uses flat evacuated panels 110 for the absorber and the evaporator. FIGS. 12 through 15 therefore show an air conditioning device that consists of many panels 110, each with an absorber 118 and evaporator 120 region. The absorbent inlet 124 and outlet 126 for each panel 110 are aligned with those of the neighboring panels 110 and joined together so that absorbent can be fed to all absorbent distributors 122 through a common inlet 124 and removed from the panels through a common outlet 126. Similarly, the refrigerant inlet 130 and outlet 132 and the purge port 138 for each panel 110 are joined to those of the neighboring panels 110.

In the complete air conditioning device, a separator plate 140 prevents the process air stream and cooling air stream from mixing. Metal fins 142, preferably made from thin aluminum, are attached to the outer surface of each panel wall 112. The fins 142 enhance the heat transfer from the panel walls 112 to the air streams.

The following examples report data observed while practicing the above-described method and apparatus.

EXAMPLE I

An interleaved absorber/evaporator as shown in FIG. 8 that has a cooling capacity of 530 tons and is made from steel plates with a 0.010" wall thickness will have the following characteristics:

| | |
|---|---|
| total area | 9,320 ft$^2$ |
| plate height | 2' |
| plate thickness | 0.079" (2 mm; wall-to-wall) |
| plate length | 15' |
| number of plates | 78 |
| gap between like plates | 0.394" (10 mm) |
| gap between opposite plates | 0.157" (4 mm) |
| stack width | 2.9' |
| absorber/evaporator volume | 87.4 ft$^3$ |
| absorber/evaporator weight | 3,800 lb |

The preceding volume does not include space for the "purge" absorber that is needed for purging, and for collection troughs at the bottom of the plates.

By comparison, the absorber and evaporator for a conventional 530 ton absorption chiller would have the following characteristics:

| | evaporator | absorber |
|---|---|---|
| tube diameter | | 0.75 in |
| horizontal spacing | 1.00 in | 1.00 in |
| vertical spacing | 0.95 in | 0.91 in |
| number of tubes | 370 | 630 |
| tube length | | 19 feet |
| total weight | | 6,000 lb |
| total volume | | 122 ft$^3$ |

Additional volume is required within the vacuum shell of the conventional chiller for the vapor path between the absorber and evaporator, brine and refrigerant distribution system, and baffles for removing water droplets from the vapor flow. Thus, the interleaved flat-plate design has a significant advantage in volume, weight and material cost.

EXAMPLE II

A 10-Ton air-cooled absorption air conditioner that directly cools process air and uses flat-plate panels, as shown in FIG. 10, would have the following characteristics:

| | |
|---|---|
| Geometry | |
| panel height | 9" |
| panel thickness | 0.25" |
| panel length | 6.375 ft |
| absorber length | 3.375 ft |
| evaporator length | 3.000 ft |
| number of panels | 36 |
| air gap between panels | 1.5" |
| fins per inch | 4 |
| overall dimensions | 9" × 6.375' × 5.2' |
| total absorber area | 180 ft$^2$ |
| total evaporator area | 160 ft$^2$ |
| Weight | |
| panel walls | 110 lb (assuming 8 mil thick steel) |
| fins | 250 lb (assuming 5 mil thick alum) |
| Operating Conditions | |
| T cooling air in | 95 F |
| T process air in | 80 F |
| T cooling air out | 115 F |
| T process air out | 57.4 F |
| cooling air volume | 6,500 cfm |
| process air volume | 4,700 cfm |
| cooling air velocity | 375 fpm (within fins) |
| process air velocity | 300 fpm (within fins) |
| LiBr inlet concentration | 62% |
| LiBr outlet concentration | 56% |

Thus, an absorber and evaporator heat exchanger for use with an absorption heat pump is disclosed. While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An absorber/evaporator subassembly for use in a heat exchange assembly comprising:

an absorber and an evaporator;

the absorber comprising a pair of vertical surfaces that receive a film of absorbent and are constructed and arranged to facilitate downward flow of the absorbent film down the surfaces without substantial formation of absorbent droplets;

the evaporator comprising a pair of vertical surfaces that receive a film of refrigerant and are constructed and arranged to facilitate downward flow of the refrigerant film down the surfaces without substantial formation of refrigerant droplets; and the evaporator surfaces being positioned facing each other and having a space therebetween, the absorber surfaces being positioned facing each other and having a space therebetween;

the opposed evaporator surfaces being sealed a long their top and bottom edges and along one side edge, the opposed absorber surfaces being sealed along their top and bottom edges and along one side edge, the absorber surfaces being joined with the evaporator surfaces along their unsealed side edges to form a single, hollow, absorber/evaporator panel that is enclosed on all sides.

2. An absorber/evaporator subassembly as set forth in claim 1, wherein absorbers and evaporators are alternately positioned so that the vertically oriented plates of the absorber and the vertically oriented plates of the evaporator are interleaved;

the sides of the absorber and evaporator plates being positioned to face one another and define a gap therebetween; and the refrigerant evaporating and producing a vapor that flows across the gap and is absorbed by the absorbent.

3. An absorber/evaporator subassembly as set forth in claim 2, further comprising a separator positioned between the interleaved, opposing plates of the absorber and the evaporator and preventing droplets of either the refrigerant or absorbent from splashing onto the opposing plates.

4. An absorber/evaporator subassembly for use in a heat exchange assembly comprising:

an absorber and an evaporator;

the absorber comprising a pair of vertical surfaces that receive a film of absorbent and are constructed and arranged to facilitate downward flow of the absorbent film down the surfaces without substantial formation of absorbent droplets;

the evaporator comprising a pair of vertical surfaces that receive a film of refrigerant and are constructed and arranged to facilitate downward flow of the refrigerant film down the surfaces without substantial formation of refrigerant droplets; and absorbers and evaporators being alternately positioned so that the vertically oriented plates of the absorber and the vertically oriented plates of the evaporator are interleaved;

the sides of the absorber and evaporator plates being positioned to face one another and define a gap therebetween;

the refrigerant evaporating and producing a vapor that flows across the gap and is absorbed by the absorbent;

a separator positioned between the interleaved, opposing plates of the absorber and the evaporator and preventing droplets of either the refrigerant or the absorbent from splashing onto the opposing plates;

the separator comprising an accommodation region at the top portion thereof and a partition at the lower portion thereof, the partition being constructed and arranged to collect droplets caused by flashing and direct the droplets back to the plate from whence they came.

5. An absorber/evaporator subassembly as set forth in claim 4, wherein the separator is positioned approximately equidistant between the opposing plates.

6. An absorber/evaporator subassembly for use in a heat exchange assembly comprising:

a plurality of absorbers and evaporators contained within a vacuum shell;

an absorber each comprising a pair of vertical surfaces that receive a film of absorbent and are constructed and arranged to facilitate downward flow of the absorbent film down the surfaces without substantial formation of absorbent droplets;

the evaporators each comprising a pair of vertical surfaces that receive a film of refrigerant and are constructed and arranged to facilitate downward flow of the refrigerant film down the surfaces without substantial formation of refrigerant droplets; and the absorbers and the evaporators being alternately positioned so that the vertically oriented plates of the absorber and the vertically oriented plates of the evaporator are interleaved;

the sides of the absorber and evaporator plates positioned to face one another and define a gap therebetween;

the refrigerant evaporating and producing a vapor that flows across the gap and is absorbed by the absorbent;

the vacuum shell being provided with a purge port; the assembly further comprising a separate absorber located within the vacuum shell and positioned to induce the migration of non-condensible gases towards the purge port.

7. A heat exchange assembly as set forth in claim 6 further comprising a purge absorber positioned at one end of the absorber and evaporator plates, the purge absorber being constructed and arranged to further draw a drift of refrigerant vapor towards the purge absorber and sweep non-condensible gases to the purge port, thereby effecting removal of non-condensible gases from the vacuum shell.

8. An absorber/evaporator subassembly for use in a heat exchange assembly comprising:

a plurality of absorbers and evaporators contained within a vacuum shell;

the absorbers each comprising a pair of vertical surfaces that receive a film of absorbent and are constructed and arranged to facilitate downward flow of the absorbent film down the surfaces without substantial formation of absorbent droplets;

the evaporators each comprising a pair of vertical surfaces that receive a film of refrigerant and are constructed and arranged to facilitate downward flow of the refrigerant film down the surfaces without substantial formation of refrigerant droplets; and the pairs of evaporator surfaces being positioned facing each other and having a space therebetween, the pairs of absorber surfaces being positioned facing each other and having a space therebetween;

the absorbers and evaporators being alternately positioned so that the vertically oriented plates of the absorber and the vertically oriented plates of the evaporator are interleaved;

the sides of the absorber and evaporator plates positioned to face one another and define a gap therebetween;

the refrigerant evaporating and producing a vapor that flows across the gap and is absorbed by the absorbent; and a partition extending horizontally between interleaved plates of the absorbers and evaporator, the partition being constructed and arranged to create a pressure gradient in the refrigerant vapor in the vertical direction between the plates.

9. A heat exchange assembly as set forth in claim 8, wherein a cover is applied over ends of the partitions.

* * * * *